United States Patent
Chen et al.

(10) Patent No.: US 12,452,405 B2
(45) Date of Patent: Oct. 21, 2025

(54) HANDLING OF Bi-DIRECTIONAL OPTICAL FLOW (BIO) CODING TOOL FOR REFERENCE PICTURE RESAMPLING IN VIDEO CODING

(71) Applicant: Huawei Technologies Co., Ltd., Shenzhen (CN)

(72) Inventors: Jianle Chen, San Diego, CA (US);
FNU Hendry, San Diego, CA (US);
Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 193 days.

(21) Appl. No.: 17/484,796

(22) Filed: Sep. 24, 2021

(65) Prior Publication Data
US 2022/0014735 A1    Jan. 13, 2022

Related U.S. Application Data

(63) Continuation of application No. PCT/US2020/032922, filed on May 14, 2020.
(Continued)

(51) Int. Cl.
*H04N 19/105*    (2014.01)
*H04N 19/132*    (2014.01)
(Continued)

(52) U.S. Cl.
CPC ......... *H04N 19/105* (2014.11); *H04N 19/132* (2014.11); *H04N 19/159* (2014.11);
(Continued)

(58) Field of Classification Search
CPC .. H04N 19/105; H04N 19/577; H04N 19/132; H04N 19/159; H04N 19/176; H04N 19/46
See application file for complete search history.

(56) References Cited

U.S. PATENT DOCUMENTS 7,876,821 B2 * 1/2011 Li .................. H04N 19/115
375/240.12
2008/0247462 A1 10/2008 Demos
(Continued)

FOREIGN PATENT DOCUMENTS

JP    2018536320 A    12/2018
JP    2022531965 A    7/2022
(Continued)

OTHER PUBLICATIONS

JVET-N0118-v1, "AHG19: Adaptive resolution change (ARC) support in VVC," Joint Video Experts Team (JVET) of ITU-T SG 16 WP 3 and ISO/IEC JTC 1/SC 29/WG 11, 14th Meeting: Geneva, CH, Mar. 19-27, 2019, 8 pages.
(Continued)

*Primary Examiner* — Kathleen V Nguyen
(74) *Attorney, Agent, or Firm* — Conley Rose, P.C.

(57) ABSTRACT

A method of decoding implemented by a video decoder including determining, by the video decoder, whether a resolution of a current picture being decoded is the same as the resolution of reference pictures identified by a reference picture list associated with the current picture; enabling, by the video decoder, bi-direction optical flow (BDOF) for a current block of the current picture when the resolution of the current picture is determined to be the same as the resolution of each of the reference pictures; disabling, by the video decoder, the BDOF for the current block of the current picture when the resolution of the current picture is determined to be different than the resolution of either of the reference pictures; and refining, by the video decoder, motion vectors corresponding to the current block using the BDOF when the BDOF is enabled for the current block.

21 Claims, 11 Drawing Sheets

Related U.S. Application Data

(60) Provisional application No. 62/848,409, filed on May 15, 2019.

(51) Int. Cl.
  *H04N 19/159* (2014.01)
  *H04N 19/176* (2014.01)
  *H04N 19/46* (2014.01)
  *H04N 19/513* (2014.01)

(52) U.S. Cl.
  CPC ........... *H04N 19/176* (2014.11); *H04N 19/46* (2014.11); *H04N 19/513* (2014.11)

(56) References Cited

U.S. PATENT DOCUMENTS

| | | | |
|---|---|---|---|
| 2009/0247462 | A1 | 10/2009 | Bogin et al. |
| 2015/0382023 | A1 | 12/2015 | Ramasubramonian et al. |
| 2017/0094305 | A1 | 3/2017 | Li et al. |
| 2017/0171563 | A1 | 6/2017 | Deshpande |
| 2017/0324981 | A1 | 11/2017 | Deshpande |
| 2019/0045214 | A1 | 2/2019 | Ikai et al. |
| 2019/0132612 | A1 | 5/2019 | Deshpande |
| 2020/0296416 | A1* | 9/2020 | Liao ............ H04N 19/139 |
| 2020/0336749 | A1* | 10/2020 | Li ............ H04N 19/176 |
| 2021/0152816 | A1* | 5/2021 | Zhang ............ H04N 19/46 |
| 2021/0368180 | A1* | 11/2021 | Park ............ H04N 19/46 |
| 2022/0060692 | A1 | 2/2022 | Zhang et al. |
| 2022/0264086 | A1 | 8/2022 | Zhang et al. |
| 2023/0133338 | A1* | 5/2023 | Zhang ............ H04N 19/105 375/240.02 |

FOREIGN PATENT DOCUMENTS

| | | |
|---|---|---|
| KR | 20140120336 A | 10/2014 |
| KR | 20160105448 A | 9/2016 |
| RU | 2685233 C2 | 4/2019 |
| WO | 2018237303 A1 | 12/2018 |
| WO | 2019195101 A1 | 10/2019 |
| WO | 2020215101 A1 | 10/2020 |

OTHER PUBLICATIONS

"Line Transmission of Non-Telephone Signals, Video Codec for Audiovisual Services at p x 64 kbits," ITU-T Recommendation H.261, Mar. 1993, 29 pages.

"Transmission of Non-Telephone Signals, Information Technology—Generic Coding of Moving Pictures and Associated Audio Information: Video," ITU-T H.262, Jul. 1995, 211 pages.

"Video Coding for Low Bit Rate Communication," Series H: Audiovisual and Multimedia Systems Infrastructure of Audiovisual Services—Coding of Moving Video, ITU-T H.263, Jan. 2005, 226 pages.

"Advanced Video Coding for Generic Audiovisual Services," Series H: Audiovisual and Multimedia Systems Infrastructure of Audiovisual Services—Coding of Moving Video, ITU-T H.264, Jun. 2019, 836 pages.

"High Efficiency Video Coding," Series H: Audiovisual and Multimedia Systems Infrastructure of Audiovisual Services—Coding of Moving Video, ITU-T H.265, Apr. 2013, 317 pages.

Bross, B., et al., "Versatile Video Coding (Draft 5)," Joint Video Experts Team (JVET) of ITU-T SG 16 WP 3 and ISO/IEC JTC 1/SC 29/WG 11, 14th Meeting: Geneva, CH, Document: JVET-N1001-v5, Mar. 19-27, 2019, 374 pages.

Chen, P., et al., "AHG 19: Adaptive Resolution Change," Joint Video Experts Team (JVET) of ITU-T SG 16 WP 3 and ISO/IEC JTC 1/SC 29/WG 11 14th Meeting: Geneva, CH, Document: JVET-N0279, Mar. 19-27, 2019, 6 pages.

Document: JVET-O1040v2 Wenger, S., et al., "AHG8: Summary of Resolution Adaptivity related proposals", XP030208056, Joint Video Experts Team (JVET) of ITU-T SG 16 WP 3 and ISO/IEC JTC 1/SC 29/WG 11, 15th Meeting: Gothenburg, SE, Jul. 3-12, 2019, 5 pages.

JVET-E1001-v2, "Algorithm description of Joint Exploration Test Model 5 (JEM5)", XP030023366117, International Organization for Standardization Organization Internationale De Normalisation ISO/IEC JTC 1/SC 29/WG 11 Coding of Moving Pictures and Audio, ISO/IEC JTC 1/SC 29/WG 11/N16698, Geneva, CH, Jan. 2017, 44 pages.

Document: JVET-M1000-v1, Sullivan, G., et al., "Meeting Report of the 13th Meeting of the Joint Video Experts Team (JVET)," Joint Video Experts Team (JVET) of ITU-T SG 16 WP 3 and ISO/IEC JTC 1/SC 29/WG 11, 13th Meeting: Marrakech, MA, Jan. 9-18, 2019, 179 pages.

Document: JVET-M0029v2, Xiu, X., et al., "CE9: Summary Report on Decoder Side MV Derivation", XP030214483, Joint Video Experts Team (JVET) of ITU-T SG 16 WP 3 and ISO/IEC JTC 1/SC 29/WG 11, 13th Meeting: Marrakech, MA, Jan. 9-18, 2019, 9 pages.

Benjamin Bross, "Versatile Video Coding (Draft 4)," Joint Video Experts Team (JVET) of ITU-T SG 16 WP 3 and ISO/IEC JTC 1/SC 29/WG 11 13th Meeting: Marrakech, MA, Jan. 9-18, 2019, 300 pages.

Benjamin Bross et al. Editors, Versatile Video Coding (Draft 4), Joint Video Team (JVET) of ITU-T SG 16 WP 3 and ISO/IEC JTC 1/SC 29/WG 11, JVET-M1001-V7: Marrakech, MA, Jan. 9-18, 2019, total 300 pages.

* cited by examiner

HANDLING OF Bi-DIRECTIONAL OPTICAL FLOW (BIO) CODING TOOL FOR REFERENCE PICTURE RESAMPLING IN VIDEO CODING

CROSS-REFERENCE TO RELATED APPLICATIONS

This application is a continuation of International Application No. PCT/US2020/032922 filed on May 14, 2020, by Futurewei Technologies, Inc., and titled "Handling of Bi-Directional Optical Flow (BIO) Coding Tool for Reference Picture Resampling in Video Coding," which claims the benefit of U.S. Provisional Patent Application No. 62/848,409 filed May 15, 2019, by Jianle Chen, et al., and titled "Handling of Bi-Directional Optical Flow (BIO) Coding Tool for Reference Picture Resampling in Video Coding," which is hereby incorporated by reference.

TECHNICAL FIELD

In general, this disclosure describes techniques for supporting bi-direction optical flow (BDOF) in video coding. More specifically, this disclosure allows BDOF for reference picture resampling but permits BDOF to be disabled for a block or samples when the spatial resolution of current and reference pictures differ.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

A first aspect relates to a method of decoding a coded video bitstream implemented by a video decoder. The method includes determining, by the video decoder, whether a resolution of a current picture being decoded is the same as the resolution of reference pictures identified by a reference picture list associated with the current picture; enabling, by the video decoder, bi-direction optical flow (BDOF) for a current block of the current picture when the resolution of the current picture is determined to be the same as the resolution of each of the reference pictures; disabling, by the video decoder, the BDOF for the current block of the current picture when the resolution of the current picture is determined to be different than the resolution of either of the reference pictures; and refining, by the video decoder, motion vectors corresponding to the current block using the BDOF when the BDOF is enabled for the current block.

The method provides techniques that allow BDOF to be selectively disabled when the spatial resolution of a current picture is different than the spatial resolution of reference pictures instead of having to disable BDOF for the entire CVS when reference picture resampling (RPR) is enabled. By having the ability to selectively disable BDOF in this manner, coding efficiency may be improved. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides enabling the BDOF comprises setting a BDOF flag to a first value, and wherein disabling the BDOF comprises setting the BDOF flag to a second value.

Optionally, in any of the preceding aspects, another implementation of the aspect provides generating the reference pictures for the current picture based on the reference picture lists in accordance with a bi-directional inter prediction mode.

Optionally, in any of the preceding aspects, another implementation of the aspect provides both selectively enabling and disabling the BDOF for blocks in a plurality of pictures depending on whether the resolution of each picture is different from or the same as the resolution of reference pictures associated with the pictures.

Optionally, in any of the preceding aspects, another implementation of the aspect provides enabling reference picture resampling (RPR) for an entire coded video sequence (CVS) containing the current picture when the BDOF is disabled.

Optionally, in any of the preceding aspects, another implementation of the aspect provides that the resolution of the current picture is disposed in a parameter set of the coded video bitstream, and wherein the current block is obtained from a slice of the current picture.

Optionally, in any of the preceding aspects, another implementation of the aspect provides displaying on a display of an electronic device an image generated using the current block.

A second aspect relates to a method of encoding a video bitstream implemented by a video encoder. The method includes determining, by the video encoder, whether a resolution of the current picture being encoded is the same as the resolution of reference pictures identified in a reference picture list associated with the current picture; enabling, by the video encoder, bi-direction optical flow (BDOF) for a current block of the current picture when the resolution of the current picture is determined to be the same as the resolution of each of the reference pictures; disabling, by the video encoder, the BDOF for the current block of the current picture when the resolution of the current picture is determined to be different than the resolution of either of the reference pictures; and refining, by the video encoder, motion vectors corresponding to the current block using the BDOF when the BDOF is enabled for the current block.

The method provides techniques that allow BDOF to be selectively disabled when the spatial resolution of a current picture is different than the spatial resolution of reference pictures instead of having to disable BDOF for the entire CVS when reference picture resampling (RPR) is enabled. By having the ability to selectively disable BDOF in this manner, coding efficiency may be improved. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides determining, by the video encoder, the motion vectors for the current picture based on the reference pictures; encoding, by the video encoder, the current picture based on the motion vectors; and decoding, by the video encoder, the current picture using a hypothetical reference decoder.

Optionally, in any of the preceding aspects, another implementation of the aspect provides enabling the BDOF comprises setting a BDOF flag to a first value, and wherein disabling the BDOF comprises setting the BDOF flag to a second value.

Optionally, in any of the preceding aspects, another implementation of the aspect provides generating the reference pictures for the current picture based on reference picture lists in accordance with a bi-directional inter prediction mode.

Optionally, in any of the preceding aspects, another implementation of the aspect provides both selectively enabling and disabling the BDOF for blocks in a plurality of pictures depending on whether the resolution of each picture is different from or the same as the resolution of reference pictures associated with the pictures.

Optionally, in any of the preceding aspects, another implementation of the aspect provides enabling reference picture resampling (RPR) for an entire coded video sequence (CVS) containing the current picture even when the BDOF is disabled.

Optionally, in any of the preceding aspects, another implementation of the aspect provides transmitting the video bitstream containing the current block toward a video decoder.

A third aspect relates to a decoding device. The decoding device includes a receiver configured to receive a coded video bitstream; a memory coupled to the receiver, the memory storing instructions; and a processor coupled to the memory, the processor configured to execute the instructions to cause the decoding device to: determine whether a resolution of a current picture being decoded is the same as the resolution of reference pictures identified by a reference picture list associated with the current block; enable bi-direction optical flow (BDOF) for a current block of the current picture when the resolution of the current picture is determined to be the same as the resolution of each of the reference pictures; disable the BDOF for the current block of the current picture when the resolution of the current picture is determined to be different than the resolution of either of the reference pictures; and refine motion vectors corresponding to the current block using the BDOF when the BDOF is enabled for the current block.

The decoding device provides techniques that allow BDOF to be selectively disabled when the spatial resolution of a current picture is different than the spatial resolution of reference pictures instead of having to disable BDOF for the entire CVS when reference picture resampling (RPR) is enabled. By having the ability to selectively disable BDOF in this manner, coding efficiency may be improved. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides reference picture resampling (RPR) is enabled for an entire coded video sequence (CVS) containing the current picture when the BDOF is disabled.

Optionally, in any of the preceding aspects, another implementation of the aspect provides a display configured to display an image as generated based on the current block.

A fourth aspect relates to an encoding device. The encoding device includes a memory containing instructions; a processor coupled to the memory, the processor configured to implement the instructions to cause the encoding device to: determine whether a resolution of the current picture being encoded is the same as the resolution of reference pictures identified in a reference picture list associated with the current picture; enable bi-direction optical flow (BDOF) for a current block of the current picture when the resolution of the current picture is determined to be the same as the resolution of each of the reference pictures; disable the BDOF for the current block of the current picture when the resolution of the current picture is determined to be different than the resolution of either of the reference pictures; and refine motion vectors corresponding to the current block using the BDOF when the BDOF is enabled for the current block; and a transmitter coupled to the processor, the transmitter configured to transmit a video bitstream containing the current block toward a video decoder.

The encoding device provides techniques that allow BDOF to be selectively disabled when the spatial resolution of a current picture is different than the spatial resolution of reference pictures instead of having to disable BDOF for the entire CVS when reference picture resampling (RPR) is enabled. By having the ability to selectively disable BDOF in this manner, coding efficiency may be improved. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Optionally, in any of the preceding aspects, another implementation of the aspect provides reference picture resampling (RPR) is enabled for an entire coded video sequence (CVS) containing the current picture even when the BDOF is disabled.

Optionally, in any of the preceding aspects, another implementation of the aspect provides the memory stores the video bitstream prior to the transmitter transmitting the bitstream toward the video decoder.

A fifth aspect relates to a coding apparatus. The coding apparatus includes a receiver configured to receive a picture to encode or to receive a bitstream to decode; a transmitter coupled to the receiver, the transmitter configured to transmit the bitstream to a decoder or to transmit a decoded image to a display; a memory coupled to at least one of the receiver or the transmitter, the memory configured to store instructions; and a processor coupled to the memory, the processor configured to execute the instructions stored in the memory to perform any of the methods disclosed herein.

The coding apparatus provides techniques that allow BDOF to be selectively disabled when the spatial resolution of a current picture is different than the spatial resolution of reference pictures instead of having to disable BDOF for the entire CVS when reference picture resampling (RPR) is enabled. By having the ability to selectively disable BDOF in this manner, coding efficiency may be improved. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

A sixth aspect relates to a system. The system includes an encoder; and a decoder in communication with the encoder, wherein the encoder or the decoder includes the decoding device, the encoding device, or the coding apparatus disclosed herein.

The system provides techniques that allow BDOF to be selectively disabled when the spatial resolution of a current picture is different than the spatial resolution of reference pictures instead of having to disable BDOF for the entire CVS when reference picture resampling (RPR) is enabled. By having the ability to selectively disable BDOF in this manner, coding efficiency may be improved. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used herein, resolution describes the number of pixels in a video file. That is, the resolution is the width and height of the projected image, measured in pixels. For example, a video might have a resolution of 1280 (horizontal pixels)× 720 (vertical pixels). This is usually written as simply 1280×720, or abbreviated to 720 p. BDOF is a process, algorithm, or coding tool used to refine motion or motion vectors for a predicted block. BDOF allows motion vectors to be found for sub-coding units based on the gradient of the difference between the two reference pictures. The RPR feature is the ability to change the spatial resolution of coded pictures in the middle of a bitstream without the need of intra-coding of the picture at the resolution-changing location.

Figure 1:
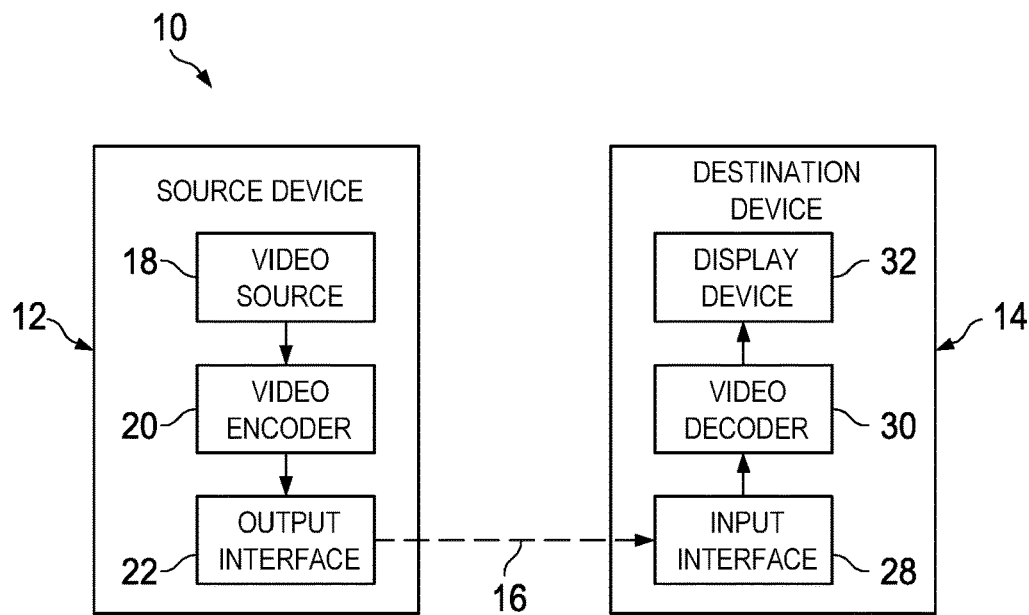
FIG. 1 is a block diagram illustrating an example coding system that may utilize video coding techniques.

FIG. 1 is a block diagram illustrating an example coding system 10 that may utilize video coding techniques as described herein. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of the source device 12 and/or the video decoder 30 of the destination device 14 may be configured to apply the techniques for video coding. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for video coding may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Moving Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
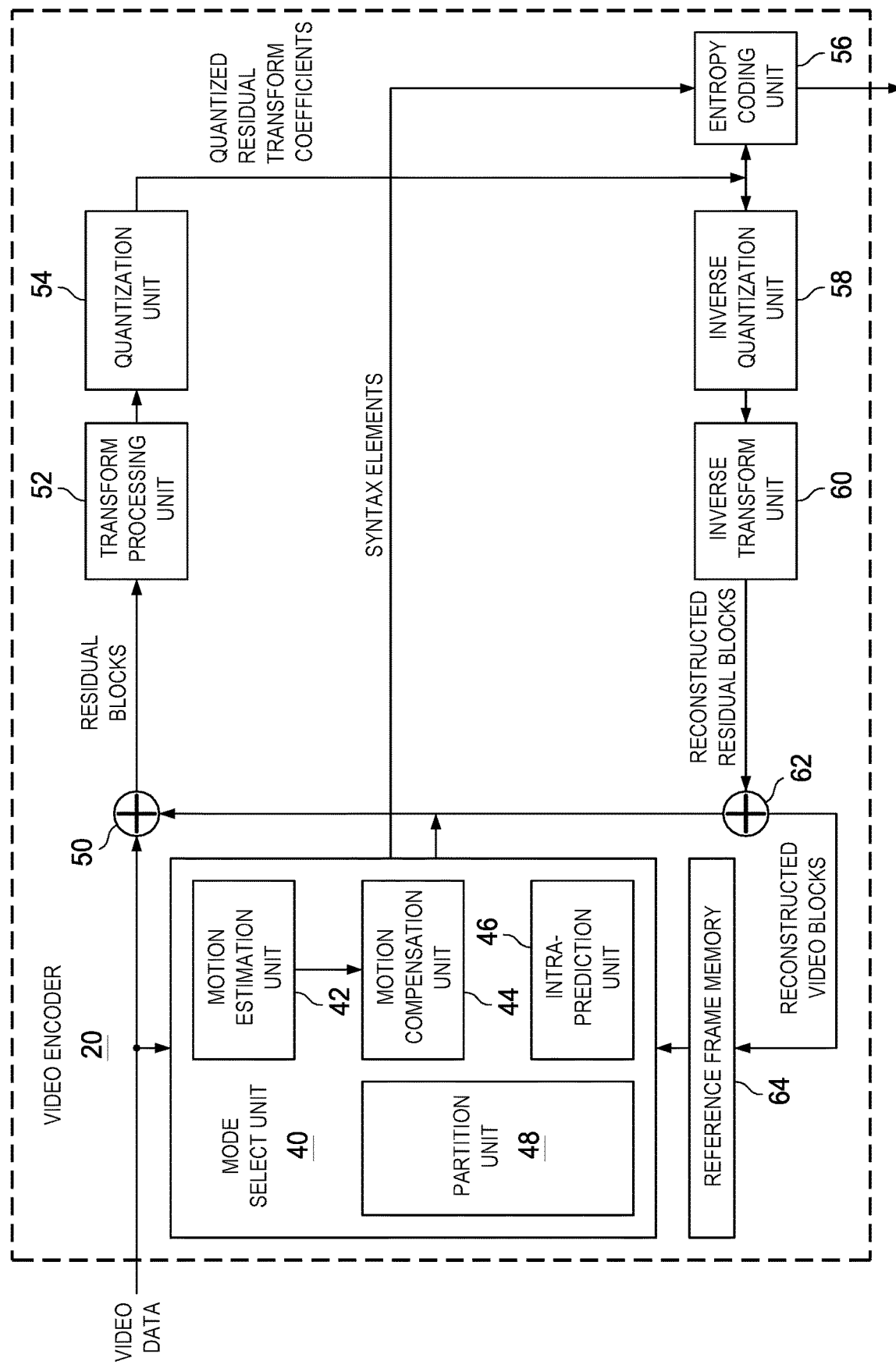
FIG. 2 is a block diagram illustrating an example video encoder that may implement video coding techniques.

FIG. 2 is a block diagram illustrating an example of video encoder 20 that may implement video coding techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional (a.k.a., uni prediction) prediction (P mode) or bi-prediction (a.k.a., bi prediction) (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction (a.k.a., intra prediction) unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quad-tree data structure indicative of partitioning of a LCU into sub-CUs. Leaf-node CUs of the quad-tree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction (a.k.a., inter prediction) mode encoded. PUs may be partitioned to be non-square in shape. Syntax data associated with a CU may also describe, for example, partitioning of the CU into one or more TUs according to a quad-tree. A TU can be square or non-square (e.g., rectangular) in shape.

Mode select unit 40 may select one of the coding modes, intra- or inter-, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM mode produces better coding results than an intra-prediction mode and the other DMM modes, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMM modes), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
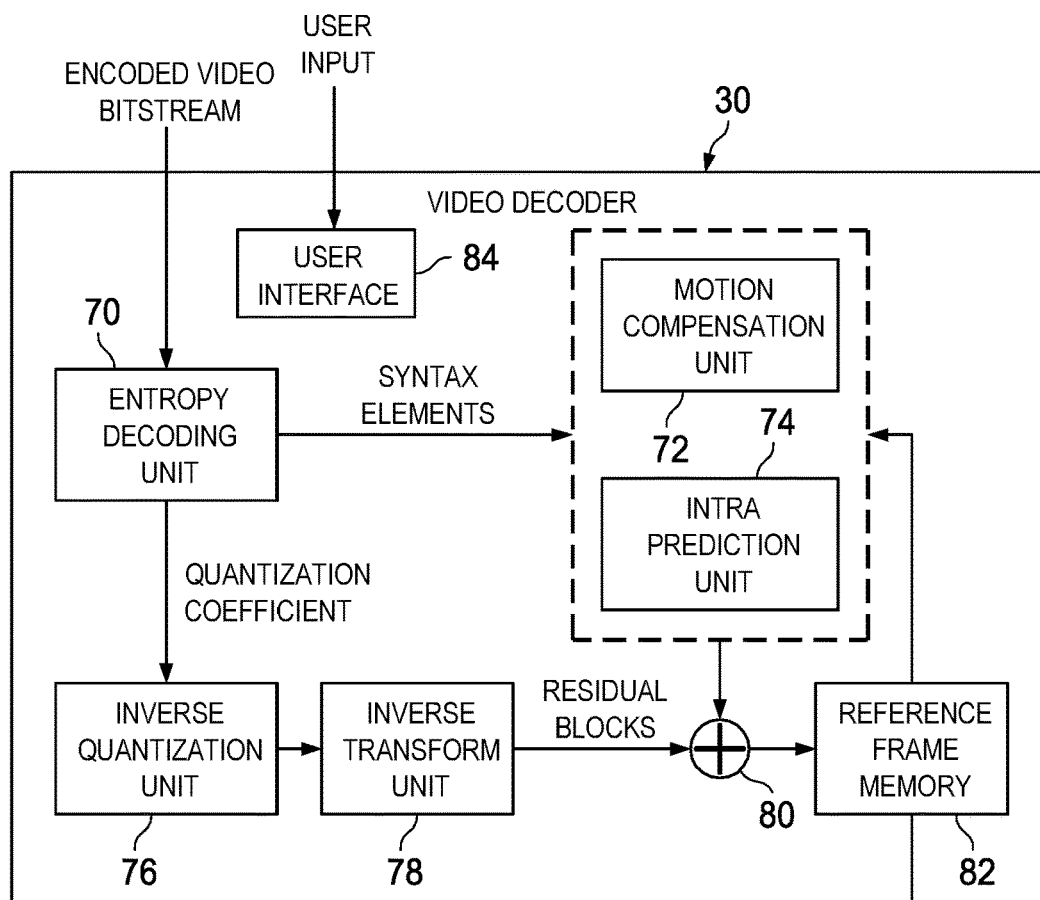
FIG. 3 is a block diagram illustrating an example of a video decoder that may implement video coding techniques.

FIG. 3 is a block diagram illustrating an example of video decoder 30 that may implement video coding techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of the video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

In an embodiment, the video decoder 30 includes a user interface (UI) 84. The user interface 84 is configured to receive input from a user of the video decoder 30 (e.g., a network administrator). Through the user interface 84, the user is able to manage or change settings on the video decoder 30. For example, the user is able to input or otherwise provide a value for a parameter (e.g., a flag) in order to control the configuration and/or operation of the video decoder 30 according the user's preference. The user interface 84 may be, for example, a graphical user interface (GUI) that allows a user to interact with the video decoder 30 through graphical icons, drop-down menus, check boxes, and so on. In some cases, the user interface 84 may receive information from the user via a keyboard, a mouse, or other peripheral device. In an embodiment, a user is able to access the user interface 84 via a smart phone, a tablet device, a personal computer located remotely from the video decoder 30, and so on. As used herein, the user interface 84 may be referred to as an external input or an external means.

Keeping the above in mind, video compression techniques perform spatial (intra-picture) prediction and/or temporal (inter-picture) prediction to reduce or remove redundancy inherent in video sequences. For block-based video coding, a video slice (i.e., a video picture or a portion of a video picture) may be partitioned into video blocks, which may also be referred to as treeblocks, coding tree blocks (CTBs), coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Image and video compression has experienced rapid growth, leading to various coding standards. Such video coding standards include ITU-T H.261, International Organization for Standardization/International Electrotechnical Commission (ISO/IEC) MPEG-1 Part 2, ITU-T H.262 or ISO/IEC MPEG-2 Part 2, ITU-T H.263, ISO/IEC MPEG-4 Part 2, Advanced Video Coding (AVC), also known as ITU-T H.264 or ISO/IEC MPEG-4 Part 10, and High Efficiency Video Coding (HEVC), also known as ITU-T H.265 or MPEG-H Part 2. AVC includes extensions such as Scalable Video Coding (SVC), Multiview Video Coding (MVC) and Multiview Video Coding plus Depth (MVC+D), and 3D AVC (3D-AVC). HEVC includes extensions such as Scalable HEVC (SHVC), Multiview HEVC (MV-HEVC), and 3D HEVC (3D-HEVC).

There is also a new video coding standard, named Versatile Video Coding (VVC), being developed by the joint video experts team (NET) of ITU-T and ISO/IEC. While the VVC standard has several working drafts, one Working Draft (WD) of VVC in particular, namely B. Bross, J. Chen, and S. Liu, "Versatile Video Coding (Draft 5)," JVET- N1001-v3, 13th JVET Meeting, Mar. 27, 2019 (VVC Draft 5) is incorporated by reference herein in its entirety.

The description of the techniques disclosed herein are based on the under-development video coding standard Versatile Video Coding (VVC) by the joint video experts team (JVET) of ITU-T and ISO/IEC. However, the techniques also apply to other video codec specifications.

Figure 4:
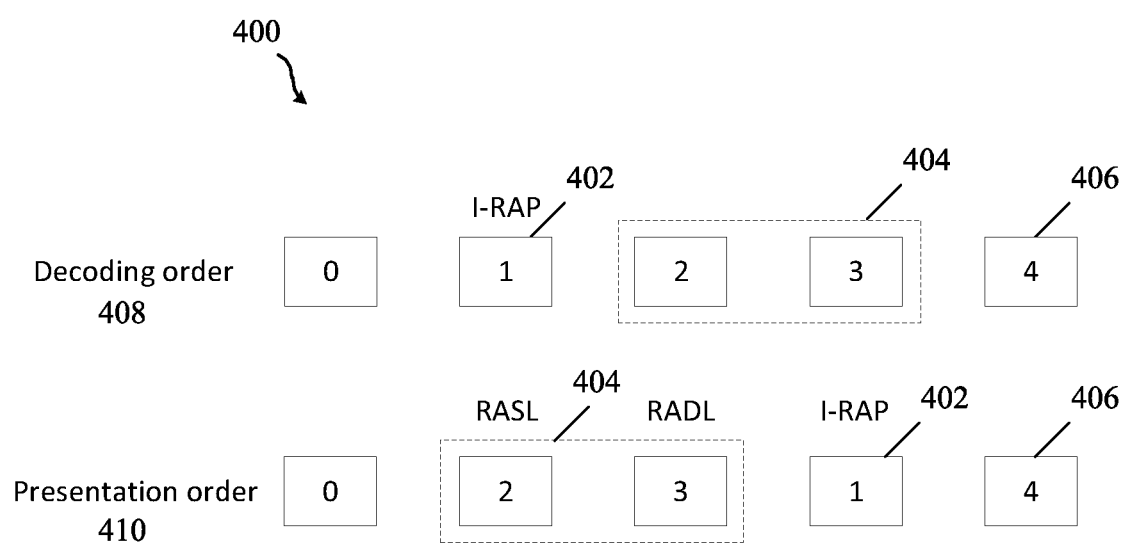
FIG. 4 is a representation of a relationship between an IRAP picture relative to leading pictures and trailing pictures in a decoding order and a presentation order.

FIG. 4 is a representation 400 of a relationship between an intra random access point (IRAP) picture 402 relative to leading pictures 404 and trailing pictures 406 in a decoding order 408 and a presentation order 410. In an embodiment, the IRAP picture 402 is referred to as a clean random access (CRA) picture or as an instantaneous decoder refresh (IDR) picture with random access decodable (RADL) picture. In HEVC, IDR pictures, CRA pictures, and Broken Link Access (BLA) pictures are all considered IRAP pictures 402. For VVC, during the 12th JVET meeting in October 2018, it was agreed to have both IDR and CRA pictures as IRAP pictures. In an embodiment, Broken Link Access (BLA) and Gradual Decoder Refresh (GDR) pictures may also be considered to be IRAP pictures. The decoding process for a coded video sequence always starts at an IRAP.

As shown in FIG. 4, the leading pictures 404 (e.g., pictures 2 and 3) follow the IRAP picture 402 in the decoding order 408, but precede the IRAP picture 402 in the presentation order 410. The trailing picture 406 follows the IRAP picture 402 in both the decoding order 408 and in the presentation order 410. While two leading pictures 404 and one trailing picture 406 are depicted in FIG. 4, those skilled in the art will appreciate that more or fewer leading pictures 404 and/or trailing pictures 406 may be present in the decoding order 408 and the presentation order 410 in practical applications.

The leading pictures 404 in FIG. 4 have been divided into two types, namely random access skipped leading (RASL) and RADL. When decoding starts with the IRAP picture 402 (e.g., picture 1), the RADL picture (e.g., picture 3) can be properly decoded; however, the RASL picture (e.g., picture 2) cannot be properly decoded. Thus, the RASL picture is discarded. In light of the distinction between RADL and RASL pictures, the type of leading picture 404 associated with the IRAP picture 402 should be identified as either RADL or RASL for efficient and proper coding. In HEVC, when RASL and RADL pictures are present, it is constrained that for RASL and RADL pictures that are associated with the same IRAP picture 402, the RASL pictures shall precede the RADL pictures in presentation order 410.

An TRAP picture 402 provides the following two important functionalities/benefits. Firstly, the presence of an IRAP picture 402 indicates that the decoding process can start from that picture. This functionality allows a random access feature in which the decoding process starts at that position in the bitstream, not necessarily the beginning of the bitstream, as long as an TRAP picture 402 is present at that position. Secondly, the presence of an IRAP picture 402 refreshes the decoding process such that a coded picture starting at the IRAP picture 402, excluding RASL pictures, are coded without any reference to previous pictures. Having an IRAP picture 402 present in the bitstream consequently would stop any error that may happen during decoding of coded pictures prior to the TRAP picture 402 to propagate to the TRAP picture 402 and those pictures that follow the TRAP picture 402 in decoding order 408.

While TRAP pictures 402 provide important functionalities, they come with a penalty to the compression efficiency. The presence of an TRAP picture 402 causes a surge in bitrate. This penalty to the compression efficiency is due to two reasons. Firstly, as an IRAP picture 402 is an intra-predicted picture, the picture itself would require relatively more bits to represent when compared to other pictures (e.g., leading pictures 404, trailing pictures 406) that are inter-predicted pictures. Secondly, because the presence of an IRAP picture 402 breaks temporal prediction (this is because the decoder would refresh the decoding process, in which one of the actions of the decoding process for this is to remove previous reference pictures in the decoded picture buffer (DPB)), the TRAP picture 402 causes the coding of pictures that follow the TRAP picture 402 in decoding order 408 to be less efficient (i.e., needs more bits to represent) because they have less reference pictures for their inter-prediction coding.

Among the picture types that are considered TRAP pictures 402, the IDR picture in HEVC has different signaling and derivation when compared to other picture types. Some of the differences are as follows.

For signaling and derivation of a picture order count (POC) value of an IDR picture, the most significant bit (MSB) part of the POC is not derived from the previous key picture but simply set to be equal to 0.

For signaling information needed for reference picture management, the slice header of an IDR picture does not contain information needed to be signaled to assist reference picture management. For other picture types (i.e., CRA, Trailing, temporal sub-layer access (TSA), etc.), information such as the reference picture set (RPS) described below or other forms of similar information (e.g., reference picture lists) are needed for the reference pictures marking process (i.e., the process to determine the status of reference pictures in the decoded picture buffer (DPB), either used for reference and unused for reference). However, for the IDR picture, such information does not need to be signaled because the presence of IDR indicates that the decoding process shall simply mark all reference pictures in the DPB as unused for reference.

In HEVC and VVC, TRAP pictures 402 and leading pictures 404 may each be contained within a single network abstraction layer (NAL) unit. A set of the NAL units may be referred to as an access unit. IRAP pictures 402 and leading pictures 404 are given different NAL unit types so that they can be easily identified by system level applications. For example, a video splicer needs to understand coded picture types without having to understand too much detail of the syntax element in the coded bitstream, particularly to identify TRAP pictures 402 from non-IRAP pictures and to identify leading pictures 404, including determining RASL and RADL pictures, from trailing pictures 406. Trailing pictures 406 are those pictures that are associated with an TRAP picture 402 and follow the TRAP picture 402 in presentation order 410. A picture may follow the particular IRAP picture 402 in decoding order 408 and precede any other IRAP picture 402 in decoding order 408. For this, giving TRAP pictures 402 and leading pictures 404 their own NAL unit type helps such applications.

For HEVC, NAL unit types for TRAP pictures include the following:
  BLA with leading picture (BLA_W_LP): NAL unit of a Broken Link Access (BLA) picture that may be followed by one or more leading pictures in decoding order.
  BLA with RADL (BLA_W_RADL): NAL unit of a BLA picture that may be followed by one or more RADL pictures but no RASL picture in decoding order.

BLA with no leading picture (BLA_N_LP): NAL unit of a BLA picture that is not followed by leading picture in decoding order.

IDR with RADL (IDR_W_RADL): NAL unit of an IDR picture that may be followed by one or more RADL pictures but no RASL picture in decoding order.

IDR with no leading picture (IDR_N_LP): NAL unit of an IDR picture that is not followed by leading picture in decoding order.

CRA: NAL unit of a Clean Random Access (CRA) picture that may be followed by leading pictures (i.e., either RASL pictures or RADL pictures or both).

RADL: NAL unit of a RADL picture.

RASL: NAL unit of a RASL picture.

For VVC, the NAL unit type for IRAP pictures 402 and leading pictures 404 are as follows:

IDR with RADL (IDR_W_RADL): NAL unit of an IDR picture that may be followed by one or more RADL pictures but no RASL picture in decoding order.

IDR with no leading picture (IDR_N_LP): NAL unit of an IDR picture that is not followed by leading picture in decoding order.

CRA: NAL unit of a Clean Random Access (CRA) picture that may be followed by leading pictures (i.e., either RASL pictures or RADL pictures or both).

RADL: NAL unit of a RADL picture.

RASL: NAL unit of a RASL picture.

The reference picture resampling (RPR) feature is the ability to change the spatial resolution of coded pictures in the middle of a bitstream without the need of intra-coding of the picture at the resolution-changing location. To enable this, a picture needs to be able refer to, for inter prediction purpose, one or more reference pictures for which the spatial resolution is different from that of the current picture. Consequently, resampling of such a reference picture, or part thereof, is needed for encoding and decoding of the current picture. Thus, the name RPR. This feature may also be referred to as adaptive resolution change (ARC) or other names. There are use cases or application scenarios that would benefit from the RPR feature, including the following.

Rate adaption in video telephony and conferencing. This is for adapting the coded video to the changing network conditions. When network conditions get worse so that available bandwidth becomes lower, the encoder may adapt to it by encoding smaller resolution pictures.

Active speaker change in multi-party video conferencing. For multi-party video conferencing, it is common that the video size for the active speaker is bigger or larger than the video size for the rest of conference participants. When the active speaker changes, the picture resolution for each participant may also need to be adjusted. The need to have ARC features becomes more important when a change in the active speaker happens frequently.

Fast start in streaming. For a streaming application, it is common that the application will buffer up to a certain length of decoded picture before starting to display pictures. Starting the bitstream with a smaller resolution would allow the application to have enough pictures in the buffer to start displaying faster.

Adaptive stream switching in streaming. The Dynamic Adaptive Streaming over HTTP (DASH) specification includes a feature named @mediaStreamStructureId. This feature enables switching between different representations at open-GOP random access points with non-decodable leading pictures, e.g., CRA pictures with associated RASL pictures in HEVC. When two different representations of the same video have different bitrates but the same spatial resolution while they have the same value of @mediaStreamStructureId, switching between the two representations at a CRA picture with associated RASL pictures can be performed, and the RASL pictures associated with the switching-at CRA pictures can be decoded with acceptable quality hence enabling seamless switching. With ARC, the @mediaStreamStructureId feature would also be usable for switching between DASH representations with different spatial resolutions.

Various methods facilitate basic techniques for supporting RPR/ARC such as signaling of lists of picture resolutions, some constraints of resampling of reference pictures in the DPB, etc. Furthermore, during the 14th WET meeting in Geneva, there were several input contributions suggesting constraints that should be applied to VVC to support RPR. The suggested constraints include the following.

Some tools shall be disabled for coding of blocks in the current picture when it refers to reference pictures that have a different resolution from the current picture. The tools include the following.

Temporal motion vector prediction (TMVP) and advanced TMVP (ATMVP). This was suggested by NET-N0118.

Decoder side motion vector refinement (DMVR). This was suggested by NET-N0279.

Bi-directional optical flow (BIO). This was suggested by NET-N0279

Bi-prediction of a block from a reference picture with a different resolution than the current picture is disallowed. This was suggested by NET-N0118.

For motion compensation, sample filtering shall be applied only once, that is, if resampling and interpolation to get to finer pel resolution (e.g., quarter-pel resolution) are needed, the two filters need to be combined and applied only once. This was suggested by NET-N0118.

Scalability in video coding usually is supported by using multi-layer coding techniques. A multi-layer bitstream comprises a base layer (BL) and one or more enhancement layers (ELs). Examples of scalabilities includes spatial scalability, quality/signal-to-noise (SNR) scalability, multi-view scalability, etc. When a multi-layer coding technique is used, a picture or a part thereof may be coded (1) without using a reference picture, i.e., using intra prediction; (2) by referencing to reference pictures that are in the same layer, i.e., using inter prediction; or (3) by referencing to reference pictures that are in other layer(s), i.e., using inter-layer prediction. A reference picture used for inter-layer prediction of the current picture is referred to as an inter-layer reference picture (ILRP).

Figure 5:
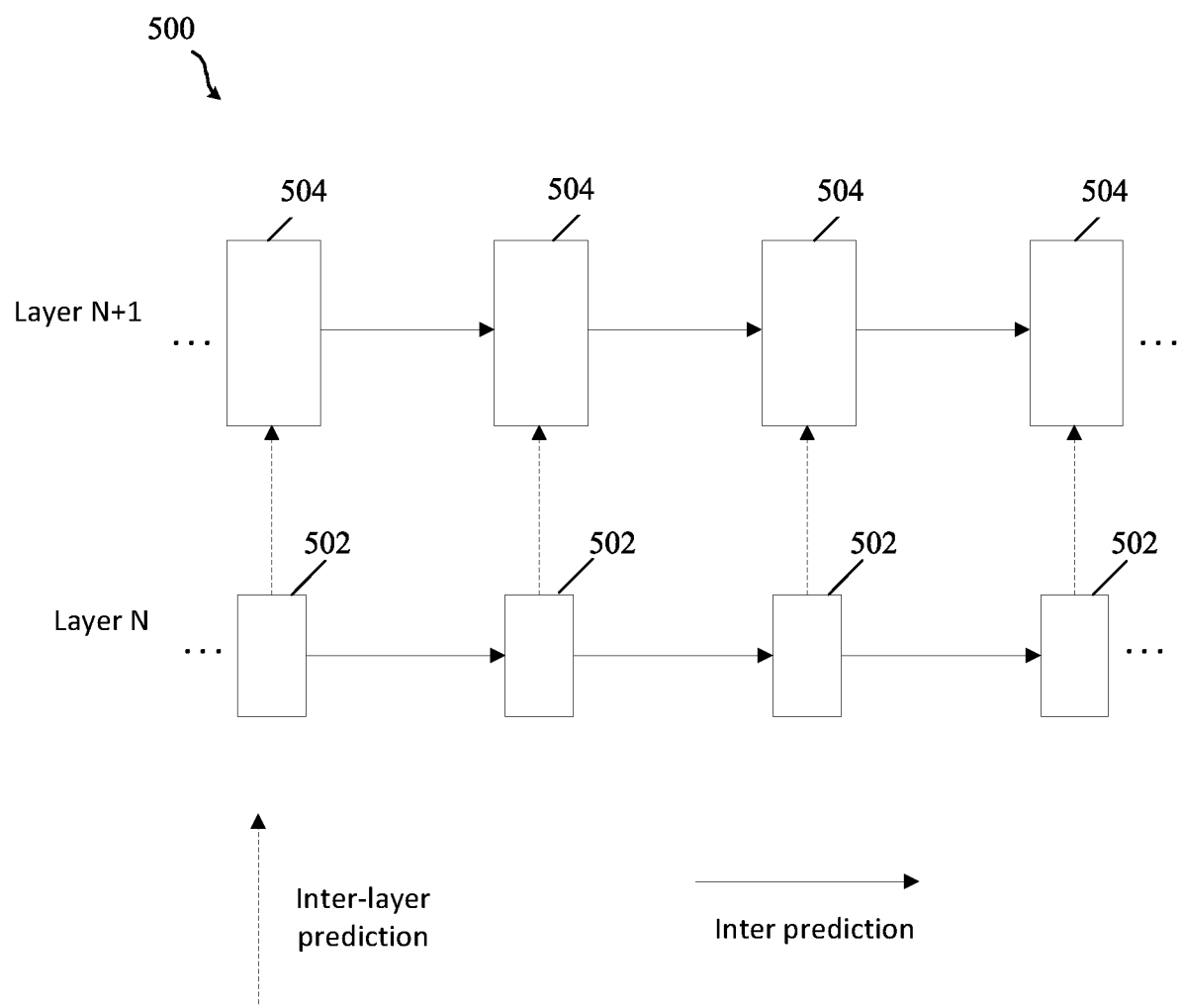
FIG. 5 illustrates an example of multi-layer coding for spatial scalability.

FIG. 5 illustrates an example of multi-layer coding for spatial scalability 500. The pictures 502 in Layer N have a different resolution (e.g., a lower resolution) than the pictures 504 in Layer N+1. In an embodiment, Layer N is considered to be the base layer and Layer N+1 is considered to be an enhancement layer as described above. The pictures 502 in Layer N and the pictures 504 in Layer N+1 may be coded using inter prediction (as shown by the solid arrow). The pictures 502 may also be coded using inter-layer prediction (as shown by the dashed arrow).

In the context of RPR, a reference picture may be resampled by either selecting a reference picture from a lower layer or by using inter-layer prediction to generate a higher layer reference picture based on a lower layer reference picture.

Previous H.26x video coding families have provided support for scalability in separate profile(s) from the profile(s) for single-layer coding. Scalable video coding (SVC) is the scalable extension of the AVC/H.264 that provides support for spatial, temporal, and quality scalabilities. For SVC, a flag is signaled in each macroblock (MB) in EL pictures to indicate whether the EL MB is predicted using the collocated block from a lower layer. The prediction from the collocated block may include texture, motion vectors, and/or coding modes. Implementations of SVC cannot directly reuse unmodified H.264/AVC implementations in their design. The SVC EL macroblock syntax and decoding process differs from H.264/AVC syntax and decoding process.

Scalable HEVC (SHVC) is the extension of the HEVC/H.265 standard that provides support for spatial and quality scalabilities, multiview HEVC (MV-HEVC) is the extension of the HEVC/H.265 that provides support for multi-view scalability, and 3D HEVC (3D-HEVC) is the extension of the HEVC/H.264 that provides supports for three dimensional (3D) video coding that is more advanced and more efficient than MV-HEVC. Note that the temporal scalability is included as an integral part of the single-layer HEVC codec. The design of the multi-layer extension of HEVC employs the idea where the decoded pictures used for inter-layer prediction come only from the same access unit (AU) and are treated as long-term reference pictures (LTRPs), and are assigned reference indices in the reference picture list(s) along with other temporal reference pictures in the current layer. Inter-layer prediction (ILP) is achieved at the prediction unit (PU) level by setting the value of the reference index to refer to the inter-layer reference picture(s) in the reference picture list(s).

Notably, both reference picture resampling and spatial scalability features require resampling of a reference picture or part thereof. Reference picture resampling can be realized at either the picture level or coding block level. However, when RPR is referred to as a coding feature, it is a feature for single-layer coding. Even so, it is possible or even preferable from a codec design point of view to use the same resampling filter for both the RPR feature of single-layer coding and the spatial scalability feature for multi-layer coding.

JVET-N0279 suggested disabling BIO for RPR. More precisely, it suggested disabling the use of BIO (a.k.a., BDOF) for the entire coded video sequence (CVS) when RPR is enabled. It is observed that even when the RPR feature is enabled, the current picture does not refer to a reference picture with a different resolution in many cases. Therefore, disabling BIO for the entire CVS is unnecessarily restricting and can hurt coding efficiency.

Disclosed herein are techniques that allow BDOF to be selectively disabled when the spatial resolution of a current picture is different than the spatial resolution of reference pictures instead of having to disable BDOF for the entire CVS when RPR is enabled. By having the ability to selectively disable BDOF in this manner, coding efficiency may be improved. Thus, usage of the processor, memory, and/or network resources may be reduced at both the encoder and the decoder. Thus, the coder/decoder (a.k.a., "codec") in video coding is improved relative to current codecs. As a practical matter, the improved video coding process offers the user a better user experience when videos are sent, received, and/or viewed.

Figure 6:
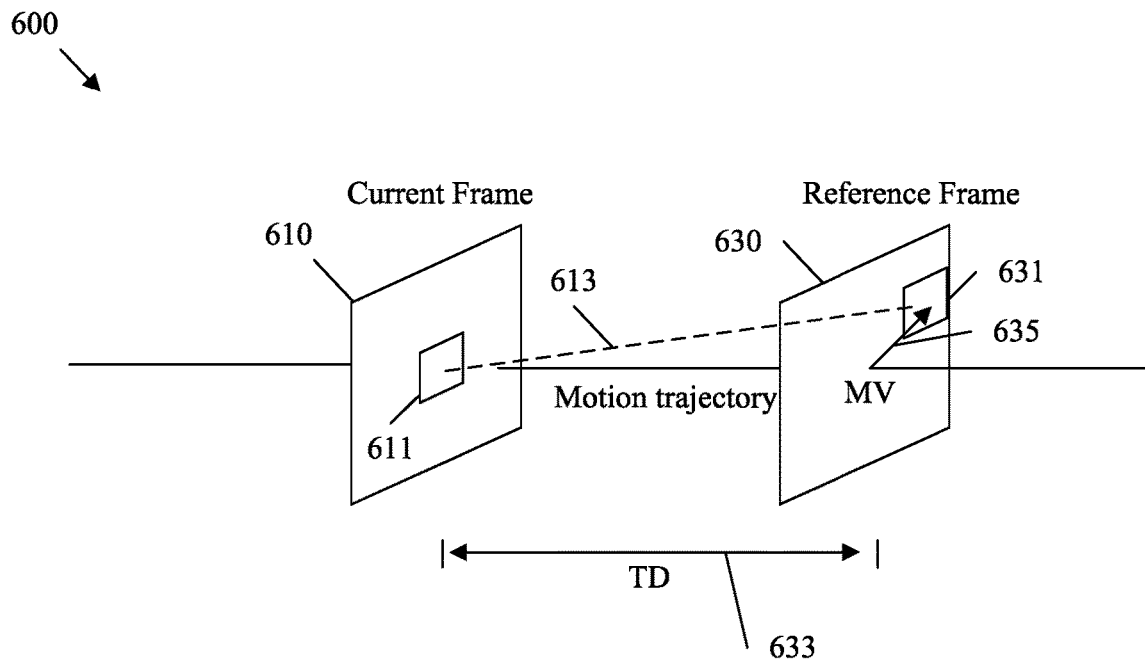
FIG. 6 is a schematic diagram illustrating an example of unidirectional inter prediction.

FIG. 6 is a schematic diagram illustrating an example of unidirectional inter prediction 600. Unidirectional inter prediction 600 can be employed to determine motion vectors for encoded and/or decoded blocks created when partitioning a picture.

Unidirectional inter prediction 600 employs a reference frame 630 with a reference block 631 to predict a current block 611 in a current frame 610. The reference frame 630 may be temporally positioned after the current frame 610 as shown (e.g., as a subsequent reference frame), but may also be temporally positioned before the current frame 610 (e.g., as a preceding reference frame) in some examples. The current frame 610 is an example frame/picture being encoded/decoded at a particular time. The current frame 610 contains an object in the current block 611 that matches an object in the reference block 631 of the reference frame 630. The reference frame 630 is a frame that is employed as a reference for encoding a current frame 610, and a reference block 631 is a block in the reference frame 630 that contains an object also contained in the current block 611 of the current frame 610.

The current block 611 is any coding unit that is being encoded/decoded at a specified point in the coding process. The current block 611 may be an entire partitioned block, or may be a sub-block when employing affine inter prediction mode. The current frame 610 is separated from the reference frame 630 by some temporal distance (TD) 633. The TD 633 indicates an amount of time between the current frame 610 and the reference frame 630 in a video sequence, and may be measured in units of frames. The prediction information for the current block 611 may reference the reference frame 630 and/or reference block 631 by a reference index indicating the direction and temporal distance between the frames. Over the time period represented by the TD 633, the object in the current block 611 moves from a position in the current frame 610 to another position in the reference frame 630 (e.g., the position of the reference block 631). For example, the object may move along a motion trajectory 613, which is a direction of movement of an object over time. A motion vector 635 describes the direction and magnitude of the movement of the object along the motion trajectory 613 over the TD 633. Accordingly, an encoded motion vector 635, a reference block 631, and a residual including the difference between the current block 611 and the reference block 631 provides information sufficient to reconstruct a current block 611 and position the current block 611 in the current frame 610.

Figure 7:
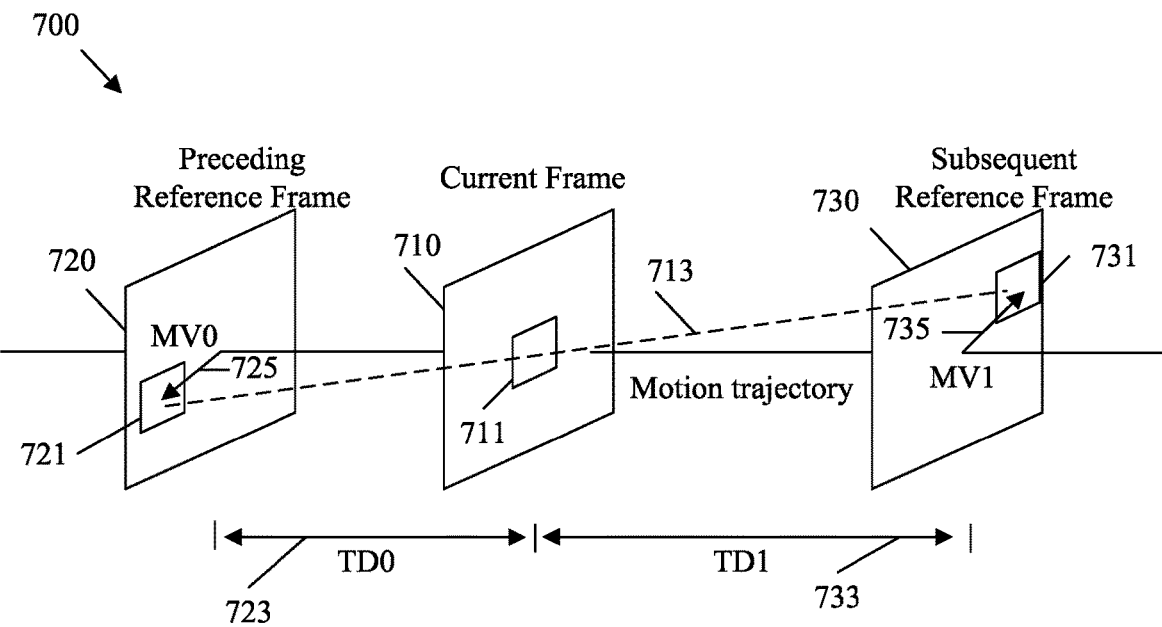
FIG. 7 is a schematic diagram illustrating an example of bidirectional inter prediction.

FIG. 7 is a schematic diagram illustrating an example of bidirectional inter prediction 700. Bidirectional inter prediction 700 can be employed to determine motion vectors for encoded and/or decoded blocks created when partitioning a picture.

Bidirectional inter prediction 700 is similar to unidirectional inter prediction 600, but employs a pair of reference frames to predict a current block 711 in a current frame 710. Hence current frame 710 and current block 711 are substantially similar to current frame 610 and current block 611, respectively. The current frame 710 is temporally positioned between a preceding reference frame 720, which occurs before the current frame 710 in the video sequence, and a subsequent reference frame 730, which occurs after the current frame 710 in the video sequence. Preceding reference frame 720 and subsequent reference frame 730 are otherwise substantially similar to reference frame 630.

The current block 711 is matched to a preceding reference block 721 in the preceding reference frame 720 and to a subsequent reference block 731 in the subsequent reference frame 730. Such a match indicates that, over the course of the video sequence, an object moves from a position at the preceding reference block 721 to a position at the subsequent reference block 731 along a motion trajectory 713 and via the current block 711. The current frame 710 is separated from the preceding reference frame 720 by some preceding temporal distance (TD0) 723 and separated from the subsequent reference frame 730 by some subsequent temporal distance (TD1) 733. The TD0 723 indicates an amount of time between the preceding reference frame 720 and the current frame 710 in the video sequence in units of frames. The TD1 733 indicates an amount of time between the current frame 710 and the subsequent reference frame 730 in the video sequence in units of frame. Hence, the object moves from the preceding reference block 721 to the current block 711 along the motion trajectory 713 over a time period indicated by TD0 723. The object also moves from the current block 711 to the subsequent reference block 731 along the motion trajectory 713 over a time period indicated by TD1 733. The prediction information for the current block 711 may reference the preceding reference frame 720 and/or preceding reference block 721 and the subsequent reference frame 730 and/or subsequent reference block 731 by a pair of reference indices indicating the direction and temporal distance between the frames.

A preceding motion vector (MV0) 725 describes the direction and magnitude of the movement of the object along the motion trajectory 713 over the TD0 723 (e.g., between the preceding reference frame 720 and the current frame 710). A subsequent motion vector (MV1) 735 describes the direction and magnitude of the movement of the object along the motion trajectory 713 over the TD1 733 (e.g., between the current frame 710 and the subsequent reference frame 730). As such, in bidirectional inter prediction 700, the current block 711 can be coded and reconstructed by employing the preceding reference block 721 and/or the subsequent reference block 731, MV0 725, and MV1 735.

In an embodiment, inter prediction and/or bi-directional inter prediction may be carried out on a sample-by-sample (e.g., pixel-by-pixel) basis instead of on a block-by-block basis. That is, a motion vector pointing to each sample in the preceding reference block 721 and/or the subsequent reference block 731 can be determined for each sample in the current block 711. In such embodiments, the motion vector 725 and the motion vector 735 depicted in FIG. 7 represent a plurality of motion vectors corresponding to the plurality of samples in the current block 711, the preceding reference block 721, and the subsequent reference block 731.

In both merge mode and advanced motion vector prediction (AMVP) mode, a candidate list is generated by adding candidate motion vectors to a candidate list in an order defined by a candidate list determination pattern. Such candidate motion vectors may include motion vectors according to unidirectional inter prediction 600, bidirectional inter prediction 700, or combinations thereof. Specifically, motion vectors are generated for neighboring blocks when such blocks are encoded. Such motion vectors are added to a candidate list for the current block, and the motion vector for the current block is selected from the candidate list. The motion vector can then be signaled as the index of the selected motion vector in the candidate list. The decoder can construct the candidate list using the same process as the encoder, and can determine the selected motion vector from the candidate list based on the signaled index. Hence, the candidate motion vectors include motion vectors generated according to unidirectional inter prediction 600 and/or bidirectional inter prediction 700, depending on which approach is used when such neighboring blocks are encoded.

Figure 8:
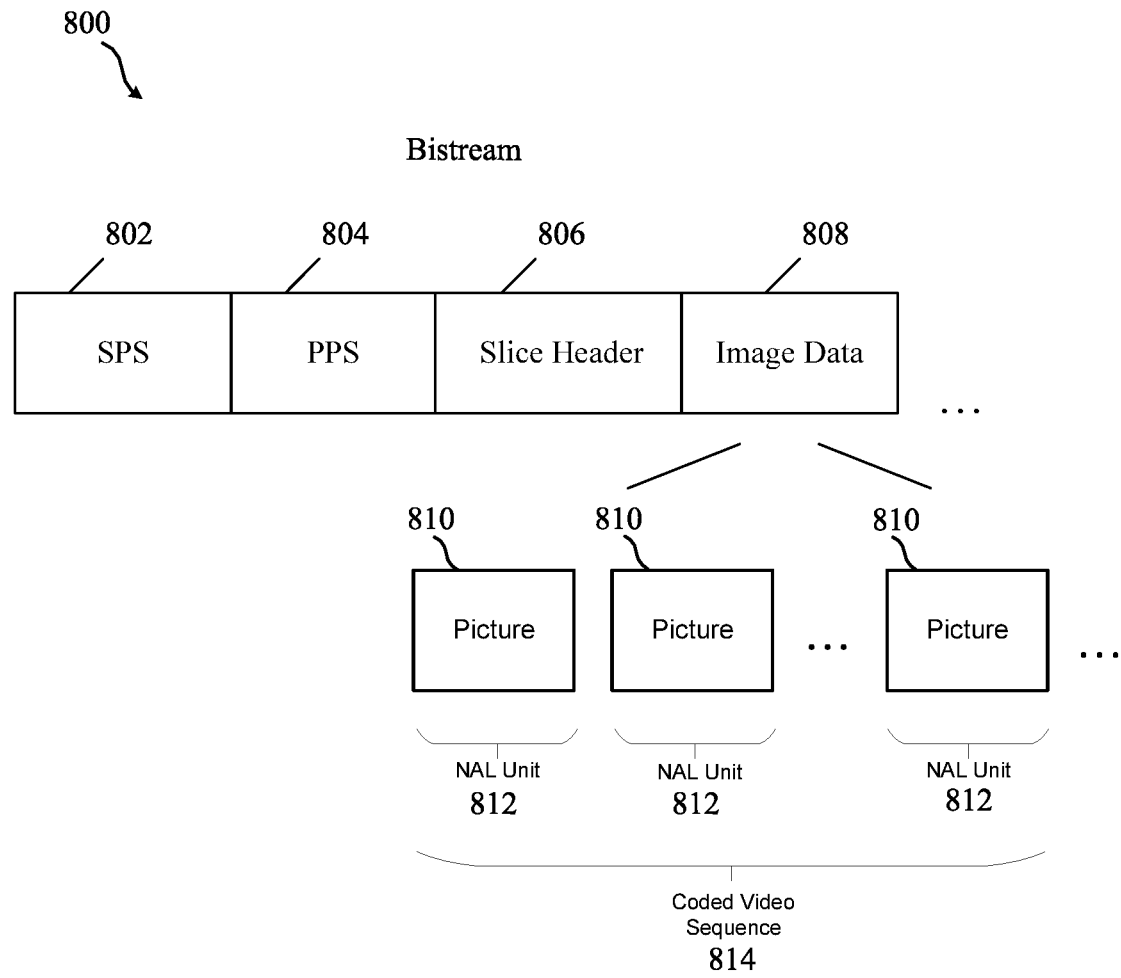
FIG. 8 illustrates a video bitstream.

FIG. 8 illustrates a video bitstream 800. As used herein the video bitstream 800 may also be referred to as a coded video bitstream, a bitstream, or variations thereof. As shown in FIG. 8, the bitstream 800 comprises a sequence parameter set (SPS) 802, a picture parameter set (PPS) 804, a slice header 806, and image data 808.

The SPS 802 contains data that is common to all the pictures in a sequence of pictures (SOP). In contrast, the PPS 804 contains data that is common to the entire picture. The slice header 806 contains information about the current slice such as, for example, the slice type, which of the reference pictures will be used, and so on. The SPS 802 and the PPS 804 may be generically referred to as a parameter set. The SPS 802, the PPS 804, and the slice header 806 are types of Network Abstraction Layer (NAL) units. A NAL unit is a syntax structure containing an indication of the type of data to follow (e.g., coded video data). NAL units are classified into video coding layer (VCL) and non-VCL NAL units. The VCL NAL units contain the data that represents the values of the samples in the video pictures, and the non-VCL NAL units contain any associated additional information such as parameter sets (important header data that can apply to a large number of VCL NAL units) and supplemental enhancement information (timing information and other supplemental data that may enhance usability of the decoded video signal but are not necessary for decoding the values of the samples in the video pictures). Those skilled in the art will appreciate that the bitstream 800 may contain other parameters and information in practical applications.

The image data 808 of FIG. 8 comprises data associated with the images or video being encoded or decoded. The image data 808 may be simply referred to as the payload or data being carried in the bitstream 800. In an embodiment, the image data 808 comprises the CVS 814 (or CLVS) containing a plurality of pictures 810. The CVS 814 is a coded video sequence for every coded layer video sequence (CLVS) in the video bitstream 800. Notably, the CVS and the CLVS are the same when the video bitstream 800 includes a single layer. The CVS and the CLVS are only different when the video bitstream 800 includes multiple layers.

As shown in FIG. 8, a slice of each picture 810 may be contained within its own VCL NAL unit 812. The set of VCL NAL units 812 in the CVS 814 may be referred to as an access unit.

Figure 9:
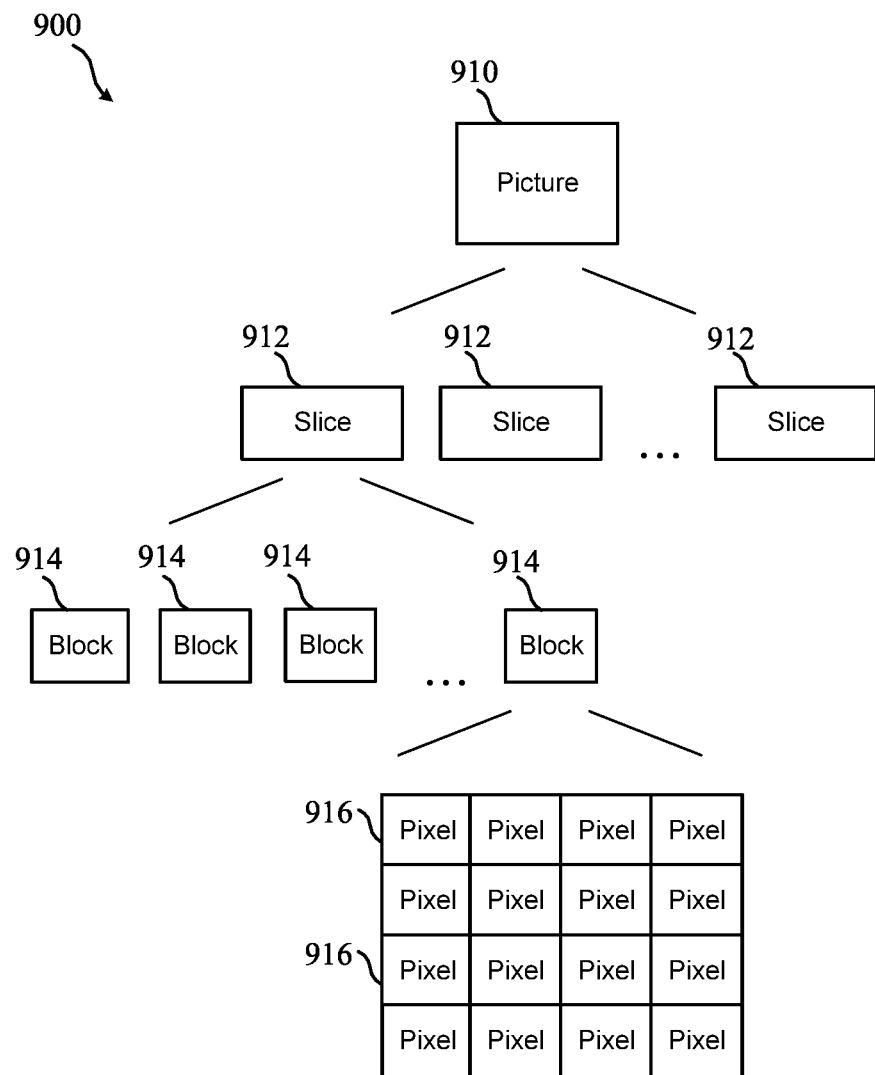
FIG. 9 illustrates a partitioning technique for a picture.

FIG. 9 illustrates a partitioning technique 900 for a picture 910. The picture 910 may be similar to any of the pictures 810 in FIG. 8. As shown, the picture 910 may be partitioned into a plurality of slices 912. A slice is a spatially distinct region of a frame (e.g., a picture) that is encoded separately from any other region in the same frame. While three slices 912 are depicted in FIG. 9, more or fewer slices may be used in practical applications. Each slice 912 may be partitioned into a plurality of blocks 914. The blocks 914 in FIG. 9 may be similar to the current block 711, the preceding reference block 721, and the subsequent reference block 731 in FIG. 7. The block 914 may represent a CU. While four blocks 914 are depicted in FIG. 9, more or fewer blocks may be used in practical applications.

Each block 914 may be partitioned into a plurality of samples 916 (e.g., pixels). In an embodiment, the size of each block 914 is measured in luma samples. While sixteen samples 916 are depicted in FIG. 9, more or fewer samples may be used in practical applications.

Figure 10:
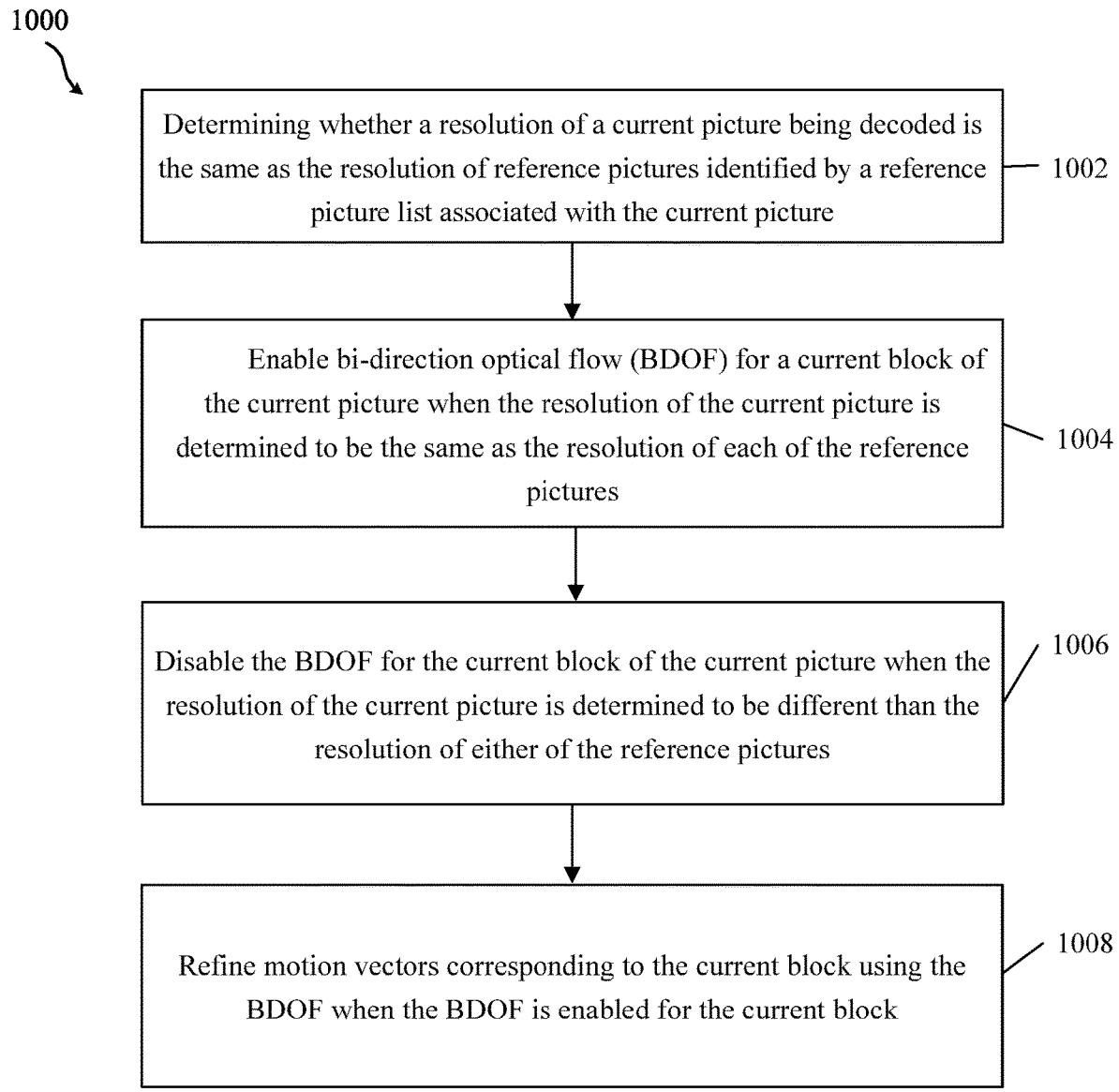
FIG. 10 is an embodiment of a method of decoding a coded video bitstream.

FIG. 10 is an embodiment of a method 1000 of decoding a coded video bitstream implemented by a video decoder (e.g., video decoder 30). The method 1000 may be performed after the decoded bitstream has been directly or indirectly received from a video encoder (e.g., video encoder 20). The method 1000 improves the decoding process by allowing BDOF to be selectively disabled when the spatial resolution of a current picture is different than the spatial resolution of reference pictures instead of having to disable BDOF for the entire CVS when RPR is enabled. By having the ability to selectively disable BDOF in this manner, coding efficiency may be improved. Therefore, as a practical matter, the performance of a codec is improved, which leads to a better user experience.

In block 1002, the video decoder determines whether a resolution of a current picture being decoded is the same as the resolution of reference pictures identified by a reference picture list. In an embodiment, the video decoder receives a coded video bitstream (e.g., the bitstream 800). The coded video bitstream contains reference picture lists, indicates a resolution of a current picture, and indicates a bi-directional inter prediction mode. In an embodiment, a reference picture list structure contains the reference picture lists. In an embodiment, the reference picture lists are used for bi-directional inter prediction. In an embodiment, the resolution of the current picture is disposed in a parameter set of the coded video bitstream. In an embodiment, the resolution of the reference pictures is derived based on the current picture, inferred based on the resolution of the current picture, parsed from the bitstream, or otherwise obtained. In an embodiment, the reference pictures for the current picture are generated based on the reference picture lists in accordance with a bi-directional inter prediction mode.

In block 1004, the video decoder enables BDOF for a current block of the current picture when the resolution of the current picture is determined to be the same as the resolution of each of the reference pictures. In an embodiment, the video decoder enables the BDOF by setting a BDOF flag to a first value (e.g., true, one, etc.). In an embodiment, BDOF is an optional process even when BDOF is enabled. That is, BDOF need not be performed even when BDOF is enabled.

In block 1006, the video decoder disables the BDOF for the current block of the current picture when the resolution of the current picture is different than the resolution of either of the reference pictures. In an embodiment, the video decoder disables the BDOF by setting the BDOF flag to a second value (e.g., false, zero).

In block 1008, the video decoder refines motion vectors corresponding to the current block when the BDOF flag is set to the first value. In an embodiment, the method 1000 further comprising selectively enabling and disabling the BDOF for other blocks in the current picture depending on whether the resolution of the current picture is different from or the same as the resolution of the reference pictures.

In an embodiment, the method further comprises enabling reference picture resampling (RPR) for an entire coded video sequence (CVS) containing the current picture even when the BDOF is disabled.

In an embodiment, the current block is obtained from a slice of the current picture. In an embodiment, the current picture comprises a plurality of slices, and wherein the current block is obtained from a slice from the plurality of slices.

In an embodiment, an image generated based on the current picture is displayed for a user of an electronic device (e.g., a smart phone, tablet, laptop, personal computer, etc.).

Figure 11:
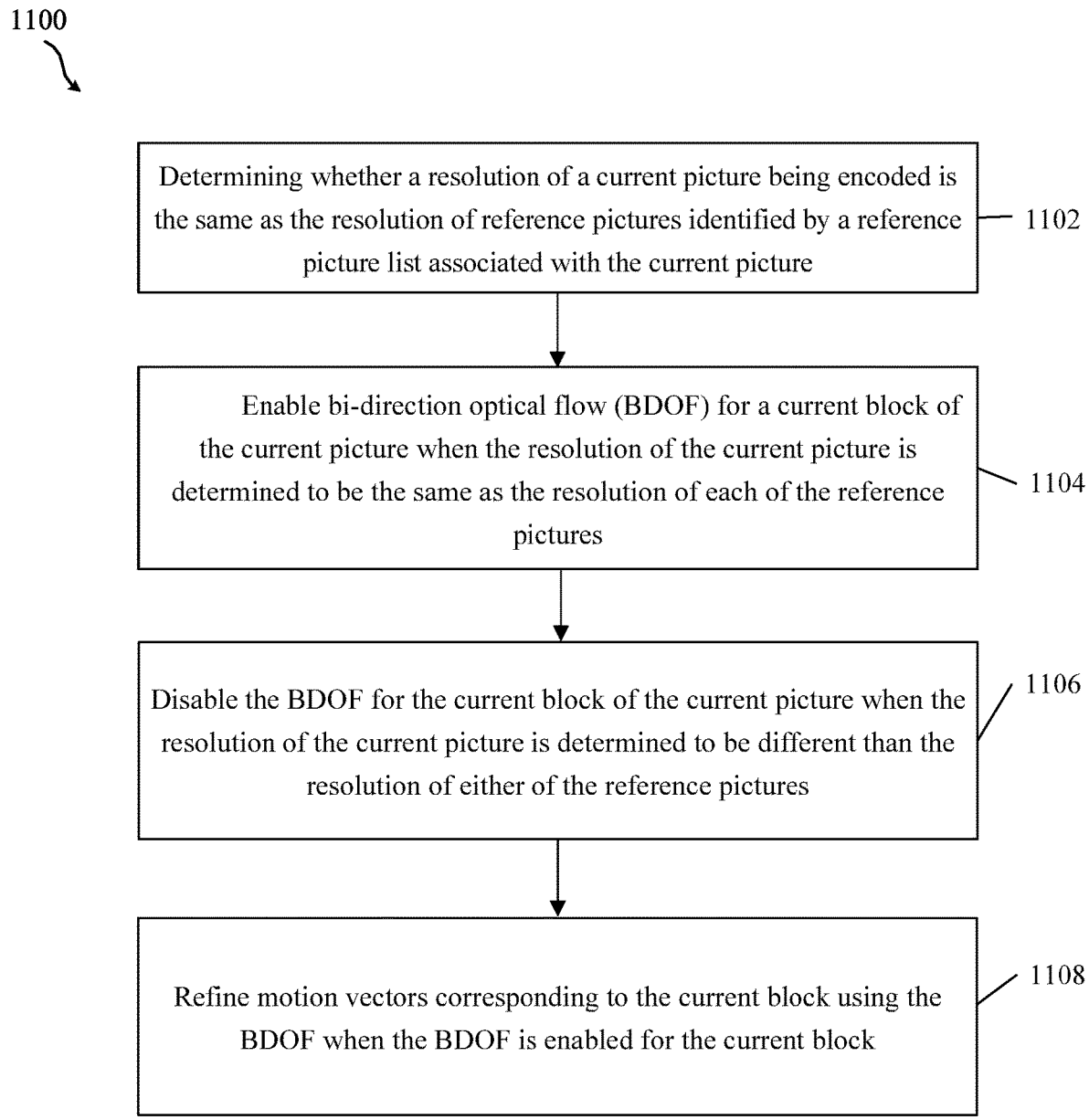
FIG. 11 is an embodiment of a method of encoding a coded video bitstream.

FIG. 11 is an embodiment of a method 1100 of encoding a video bitstream implemented by a video encoder (e.g., video encoder 20). The method 900 may be performed when a picture (e.g., from a video) is to be encoded into a video bitstream and then transmitted toward a video decoder (e.g., video decoder 30). The method 1100 improves the encoding process by allowing BDOF to be selectively disabled when the spatial resolution of a current picture is different than the spatial resolution of reference pictures instead of having to disable BDOF for the entire CVS when RPR is enabled. By having the ability to selectively disable BDOF in this manner, coding efficiency may be improved. Therefore, as a practical matter, the performance of a codec is improved, which leads to a better user experience.

In block 1102, the video encoder determines whether a resolution of a current picture being encoded is the same as the resolution of reference pictures identified by a reference picture list. In an embodiment, a reference picture list structure contains the reference picture lists. In an embodiment, the reference picture lists are used for bi-directional inter prediction. In an embodiment, the resolution of the current picture is encoded in a parameter set of a video bitstream. In an embodiment, the reference pictures for the current picture are generated based on the reference picture lists in accordance with a bi-directional inter prediction mode.

In block 1104, the video encoder enables BDOF for a current block of the current picture when the resolution of the current picture is determined to be the same as the resolution of each of the reference pictures. In an embodiment, the video encoder enables the BDOF by setting a BDOF flag to a first value (e.g., true, one, etc.). In an embodiment, BDOF is an optional process even when BDOF is enabled. That is, BDOF need not be performed even when BDOF is enabled.

In an embodiment, the method includes determining motion vectors for the current picture based on the reference pictures, encoding the current picture based on the motion vectors, and decoding the current picture using a hypothetical reference decoder (HRD).

In block 1106, the video encoder disables the BDOF for the current block of the current picture when the resolution of the current picture is different than the resolution of either of the reference pictures. In an embodiment, the video encoder disables the BDOF by setting the BDOF flag to a second value (e.g., false, zero).

In block 1108, the video encoder refines motion vectors corresponding to the current block when the BDOF flag is set to the first value. In an embodiment, the method 1100 further comprising selectively enabling and disabling the BDOF for other blocks in the current picture depending on whether the resolution of the current picture is different from or the same as the resolution of the reference pictures.

In an embodiment, the method further comprises enabling reference picture resampling (RPR) for an entire coded video sequence (CVS) containing the current picture even when the BDOF is disabled.

In an embodiment, the current block is obtained from a slice of the current picture. In an embodiment, the current picture comprises a plurality of slices, and wherein the current block is obtained from a slice from the plurality of slices.

In an embodiment, the video encoder generates a video bitstream containing the current block and transmits the video bitstream toward a video decoder. In an embodiment, the video encoder stores the video bitstream for transmission toward the video decoder.

In an embodiment, a method for decoding a video bitstream is disclosed. The video bitstream comprises at least one picture. Each picture comprises a plurality of slices. Each slice of the plurality of slices comprises a plurality of coding blocks and a plurality of reference picture lists. Each reference picture list of the plurality of reference picture lists comprises a plurality of reference pictures that may be used for inter prediction of the coding blocks in the slice.

The method includes parsing a parameter set to obtain the resolution information of a current picture; obtaining two reference picture lists of the current slice in the current picture; determining a reference picture for decoding the current coding block in the current slice; determining the resolution of the reference picture; deciding whether bi-direction optical flow (BIO) is used or enabled for decoding of the current coding block based on the resolutions of the current picture and the reference picture; and decoding the current coding block.

In an embodiment, the method includes that the BIO is not used or is disabled for decoding of the current coding block when the resolutions of the current picture and the reference picture are different.

In an embodiment, a method for decoding a video bitstream is disclosed. The video bitstream comprises at least one picture. Each picture comprises a plurality of slices. Each slice of the plurality of slices is associated with a header containing a plurality of syntax elements. Each slice of the plurality of slices comprises a plurality of coding blocks and a plurality of reference picture lists. Each reference picture list of the plurality of reference picture lists comprises a plurality of reference pictures that may be used for inter prediction of the coding blocks in the current slice.

The method includes parsing a parameter set to obtain a flag specifying whether bi-direction optical flow (BIO) coding tool/technique may be used for decoding of pictures in the current coded video sequence; obtaining the current slice in the current picture; when the value of the flag specifying whether bi-direction optical flow (BIO) coding tool/technique may be used for decoding of pictures in the current coded video sequence specifies that BIO may be used, parsing the slice header associated with the current slice to obtain a flag specifying whether BIO coding tool may be used for decoding of coding blocks in the current slice.

In an embodiment, the BIO coding tool is not used or is disabled for decoding of the current coding block when the value of the flag specifying whether BIO coding tool may be used for decoding of coding blocks in the current slice specifies that the coding tool may not be used for the decoding of the current slice.

In an embodiment, when not present, the value of the flag specifying whether BIO coding tool may be used for decoding of coding blocks in the current slice is inferred to be the same as the value of the flag specifying whether bi-direction optical flow (BIO) coding tool/technique may be used for decoding of pictures in the current coded video sequence.

In an embodiment, a method for encoding a video bitstream is disclosed. The video bitstream comprises at least one picture. Each picture comprises a plurality of slices. Each slice of the plurality of slices is associated with a header containing a plurality of syntax elements. Each slice of the plurality of slices comprises a plurality of coding blocks and a plurality of reference picture lists. Each reference picture list of the plurality of reference picture lists comprises of a plurality of reference pictures that may be used for inter prediction of the coding blocks in the current slice.

The method includes determining whether a bi-direction optical flow (BIO) coding tool/technique may be used for encoding of pictures in the current coded video sequence; parsing a parameter set to obtain the resolution information of each picture bitstream; obtaining two reference picture lists of the current slice in the current picture; parsing the reference picture lists of the current slice to obtain active reference pictures that may be used for decoding of coding blocks of the current slice; constraining that BIO coding tool may not be used for encoding of coding blocks in the current slice if at least one of the following conditions is satisfied: BIO coding tool may not be used for encoding of pictures in the current coded video sequence, and resolutions of the current picture and at least one of the reference picture are different.

In an embodiment, a method for decoding a video bitstream is disclosed. The bitstream comprises at least one picture. Each picture comprises a plurality of slices. Each slice of the plurality of slices is associated with a header containing a plurality of syntax elements. Each slice of the plurality of slices comprises a plurality of coding blocks and a plurality of reference picture lists. Each reference picture list of the plurality of reference picture lists comprises of a plurality of reference pictures that may be used for inter prediction of the coding blocks in the current slice.

The method includes parsing a parameter set to obtain a flag specifying whether bi-direction optical flow (BIO) coding tool/technique may be used for decoding of pictures in the current coded video sequence; and parsing a parameter set to obtain a flag specifying whether bi-direction optical flow (BIO) coding tool/technique may be used for decoding of pictures that refer to the parameter set wherein the parameter set being Picture Parameter Set (PPS).

In an embodiment, the BIO coding tool is not used or is disabled for decoding of the current coding block when the value of the flag specifying whether BIO coding tool may be used for decoding of pictures that refer to the PPS specifies that the coding tool may not be used.

In an embodiment, a method for encoding a video bitstream is disclosed. The video bitstream comprises at least one picture. Each picture comprises a plurality of slices. Each slice of the plurality of slices is associated with a header containing a plurality of syntax elements. Each slice of the plurality of slices comprises a plurality of coding blocks and a plurality of reference picture lists. Each reference picture list of the plurality of reference picture lists comprises of a plurality of reference pictures that may be used for inter prediction of the coding blocks in the current slice.

In an embodiment, the method includes determining whether bi-direction optical flow (BIO) coding tool/technique may be used for encoding of pictures in the current coded video sequence; determining whether bi-direction optical flow (BIO) coding tool/technique may be used for encoding of pictures in referring to the current PPS; and constraining that BIO coding tool may not be used for encoding of pictures in referring to the current PPS when BIO coding tool may not be used for encoding of pictures in the current coded sequence.

The following syntax and semantics may be employed to implement the embodiments disclosed herein. The following description is relative to the basis text, which is the latest VVC draft specification. In other words, only the delta is described, while the text in the basis text that are not mentioned below apply as they are. Added text relative to the basis text is shown in bold, and removed text is shown in italics.

Update the reference picture list construction process as follows.

The reference picture lists RefPicList[0] and RefPicList[1] are constructed as follows:

```
for( i = 0; i < 2; i++) {
    for( j = 0, k = 0, pocBase = PicOrderCntVal; j < num_ref_entries[ i ][ RplsIdx[ i ] ];
j++) {
        if( st_ref_pic_flag[ i ][ RplsIdx[ i ] ][ j ] ) {
            RefPicPocList[ i ][ j ] = pocBase - DeltaPocSt[ i ][ RplsIdx[ i ] ][ j ]
            if( there is a reference picture picA in the DPB with PicOrderCntVal equal to
RefPicPocList[ i ][ j ] )
                RefPicList[ i ][ j ] = picA
```

```
      else
        RefPicList[ i ][ j ] = "no reference picture"                (8-5)
        pocBase = RefPicPocList[ i ][ j ]
    } else {
      if( !delta_poc_msb_cycle_lt[ i ][ k ] ) {
        if( there is a reference picA in the DPB with
PicOrderCntVal & ( MaxPicOrderCntLsb − 1 )
            equal to PocLsbLt[ i ][ k ] )
          RefPicList[ i ][ j ] = picA
        else
          RefPicList[ i ][ j ] = "no reference picture"
      } else {
        if( there is a reference picA in the DPB with PicOrderCntVal equal to
            FullPocLt[ i ][ RplsIdx[ i ] ][ k ] )
          RefPicList[ i ][ j ] = picA
        else
          RefPicList[ i ][ j ] = "no reference picture"
      }
      k++
    }
    if( the values of PicWidthInSamplesY of RefPicList[ i ][ j ] and the current
picture are the same AND
        the values of PicHeightInSamplesY of RefPicList[ i ][ j ] and the current
picture are the same)
      RefPicSameSizeFlag[ i ][ j ] = 1
    else
      RefPicSameSizeFlag[ i ][ j ] = 0
  }
}
```

Derivation of the flag that determine whether BIO is used or not.

Let $predSamplesL0_L$, $predSamplesL1_L$ and $predSamplesIntra_L$ be (cbWidth)×(cbHeight) arrays of predicted luma sample values and, $predSamplesL0_{Cb}$, $predSamplesL1_{Cb}$, $predSamplesL0_{Cr}$ and $predSamplesL1_{Cr}$, $predSamplesIntra_{Cb}$, and $predSamplesIntra_{Cr}$ be (cbWidth/2)×(cbHeight/2) arrays of predicted chroma sample values.

The variable currPic specifies the current picture and the variable bdofFlag is derived as follows:

If all of the following conditions are true, bdofFlag is set equal to TRUE.

sps_bdof_enabled_flag is equal to 1.

predFlagL0[xSbIdx][ySbIdx] and predFlagL1[xSbIdx][ySbIdx] are both equal to 1.

DiffPicOrderCnt(currPic, RefPicList[0][refIdxL0])*DiffPicOrderCnt(currPic, RefPicList[1][refIdxL1]) is less than 0.

MotionModelIdc[xCb][yCb] is equal to 0.

merge_subblock_flag[xCb][yCb] is equal to 0.

BcwIdx[xCb][yCb] is equal to 0.

luma_weight_l0_flag[refIdxL0] and
luma_weight_l1_flag[refIdxL1] are both equal to 0.

cbHeight is greater than or equal to 8 cIdx is equal to 0.

RefPicSameSizeFlag[0][refIdxL0] is equal to 1

RefPicSameSizeFlag[1][refIdxL1] is equal to 1.

Otherwise, bdofFlag is set equal to FALSE.

Sequence Parameter Set syntax and semantics.

| seq_parameter_set_rbsp( ) { | Descriptor |
|---|---|
| ... | |
| sps_bdof_enabled_flag | u(1) |
| ... | |
| } | | sps_bdof_enabled_flag equal to 0 specifies that the bidirectional optical flow inter prediction is disabled. sps_bdof_enabled_flag equal to 1 specifies that the bidirectional optical flow inter prediction is enabled.

Slice header syntax and semantics.

| slice_header( ) { | Descriptor |
|---|---|
| ... | |
| if( sps_bdof_enabled_flag ) | |
|   slice_bdof_enabled_flag | u(1) |
| ... | |
| } | | slice_bdof_enabled_flag equal to 0 specifies that the bidirectional optical flow inter prediction is disabled for the current slice. slice_bdof_enabled_flag equal to 1 specifies that the bidirectional optical flow inter prediction is enabled for the current slice. When not present, the value of slice_bdof_enabled_flag is inferred to be equal to sps_bdof_enabled_flag.

Derivation of the flag that determine whether BIO is used or not.

Let predSamplesL0L, predSamplesL1L and predSamplesIntraL be (cbWidth)×(cbHeight) arrays of predicted luma sample values and, predSamplesL0Cb, predSamplesL1Cb, predSamplesL0Cr and predSamplesL1Cr, predSamplesIntraCb, and predSamplesIntraCr be (cbWidth/2)×(cbHeight/2) arrays of predicted chroma sample values.

The variable currPic specifies the current picture and the variable bdofFlag is derived as follows:

If all of the following conditions are true, bdofFlag is set equal to TRUE.

sps_bdof_enabled_flag is equal to 1.

slice_bdof_enabled_flag is equal to 1.

predFlagL0[xSbIdx][ySbIdx] and predFlagL1[xSbIdx][ySbIdx] are both equal to 1.

DiffPicOrderCnt(currPic, RefPicList[0][refIdxL0])*DiffPicOrderCnt(currPic, RefPicList[1][refIdxL1]) is less than 0.

MotionModelIdc[xCb][yCb] is equal to 0.

merge subblock flag[xCb][yCb] is equal to 0.
BcwIdx[xCb][yCb] is equal to 0.
luma_weight_l0_flag[refIdxL0] and luma_weight_l1_flag[refIdxL1] are both equal to 0.
cbHeight is greater than or equal to 8
cIdx is equal to 0.
Otherwise, bdofFlag is set equal to FALSE.
Sequence Parameter Set syntax and semantics.

| seq_parameter_set_rbsp( ) { | Descriptor |
|---|---|
| ... | |
| sps_bdof_enabled_flag | u(1) |
| ... | |
| } | | sps_bdof_enabled_flag equal to 0 specifies that the bidirectional optical flow inter prediction is disabled. sps_bdof_enabled_flag equal to 1 specifies that the bidirectional optical flow inter prediction is enabled.
Picture Parameter Set syntax and semantics.

| pic_parameter_set_rbsp ( ) { | Descriptor |
|---|---|
| ... | |
| pps_bdof_enabled_flag | u(1) |
| ... | |
| } | | pps_bdof_enabled_flag equal to 0 specifies that the bidirectional optical flow inter prediction is disabled for pictures that refer to the PPS. pps_bdof_enabled_flag equal to 1 specifies that the bidirectional optical flow inter prediction is enabled for the pictures that refer to the PPS.

It is a requirement of bitstream conformance that the value of pps_bdof_enabled_flag shall be equal to 0 when the value of sps_bdof_enabled_flag is equal to 0.

Derivation of the flag that determine whether BIO is used or not.

Let predSamplesL0$_L$, predSamplesL1$_L$ and predSamplesIntra$_L$ be (cbWidth)×(cbHeight) arrays of predicted luma sample values and, predSamplesL0$_{Cb}$, predSamplesL1$_{Cb}$, predSamplesL0$_{Cr}$ and predSamplesL1$_{Cr}$, predSamplesIntra$_{Cb}$, and predSamplesIntra$_{Cr}$ be (cbWidth/2)×(cbHeight/2) arrays of predicted chroma sample values.

The variable currPic specifies the current picture and the variable bdofFlag is derived as follows:
If all of the following conditions are true, bdofFlag is set equal to TRUE.
sps_bdof_enabled_flag is equal to 1.
pps_bdof_enabled_flag is equal to 1.
predFlagL0[xSbIdx][ySbIdx] and predFlagL1[xSbIdx][ySbIdx] are both equal to 1.
DiffPicOrderCnt(currPic, RefPicList[0][refIdxL0])*DiffPicOrderCnt(currPic, RefPicList[1][refIdxL1]) is less than 0.
MotionModelIdc[xCb][yCb] is equal to 0.
merge_subblock_flag[xCb][yCb] is equal to 0.
BcwIdx[xCb][yCb] is equal to 0.
luma_weight_l0_flag[refIdxL0] and luma_weight_l1_flag[refIdxL1] are both equal to 0.
cbHeight is greater than or equal to 8
cIdx is equal to 0.
Otherwise, bdofFlag is set equal to FALSE.

Figure 12:
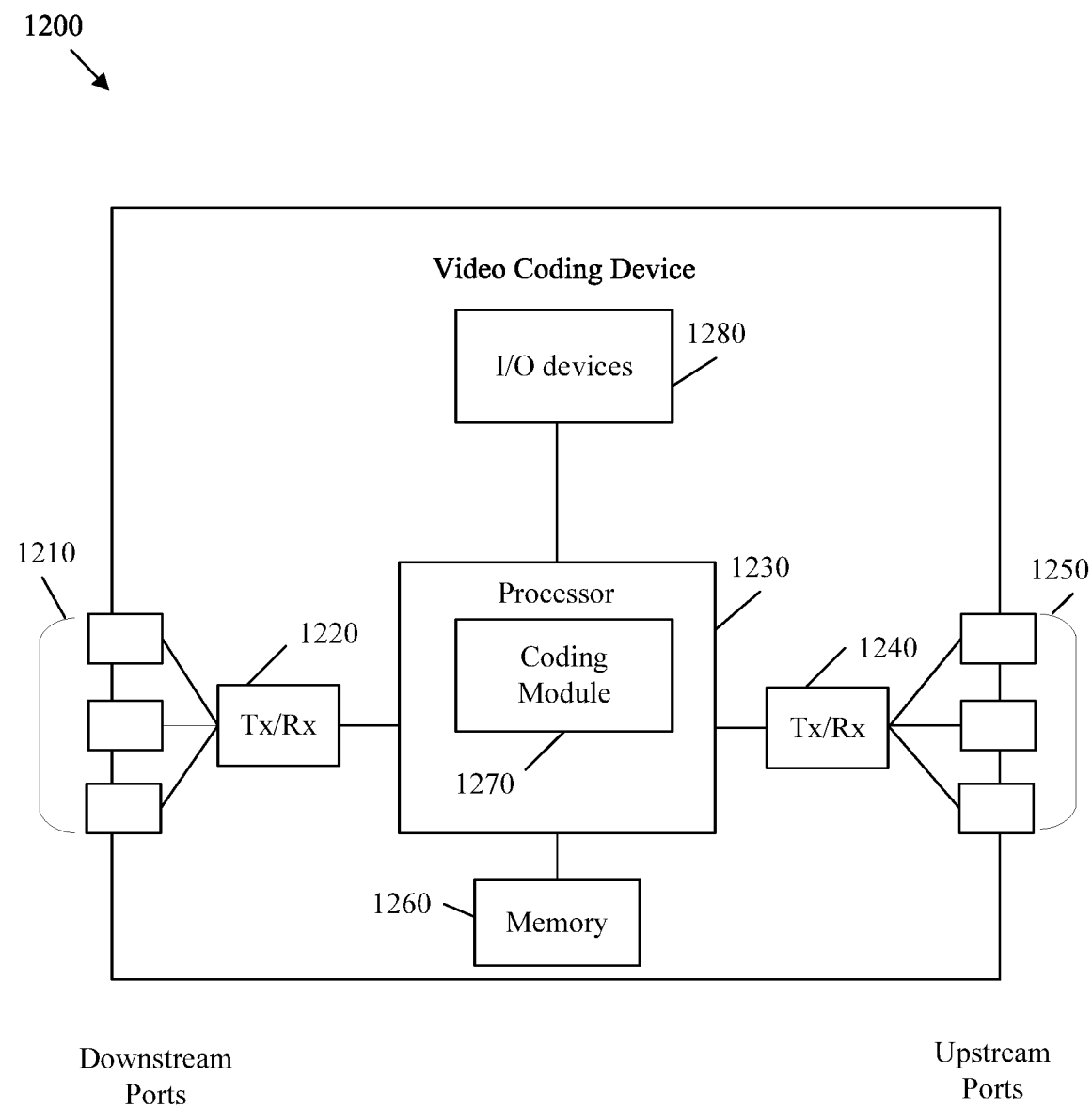
FIG. 12 is a schematic diagram of a video coding device.

FIG. 12 is a schematic diagram of a video coding device 1200 (e.g., a video encoder 20 or a video decoder 30) according to an embodiment of the disclosure. The video coding device 1200 is suitable for implementing the disclosed embodiments as described herein. The video coding device 1200 comprises ingress ports 1210 and receiver units (Rx) 1220 for receiving data; a processor, logic unit, or central processing unit (CPU) 1230 to process the data; transmitter units (Tx) 1240 and egress ports 1250 for transmitting the data; and a memory 1260 for storing the data. The video coding device 1200 may also comprise optical-to-electrical (OE) components and electrical-to-optical (EO) components coupled to the ingress ports 1210, the receiver units 1220, the transmitter units 1240, and the egress ports 1250 for egress or ingress of optical or electrical signals.

The processor 1230 is implemented by hardware and software. The processor 1230 may be implemented as one or more CPU chips, cores (e.g., as a multi-core processor), field-programmable gate arrays (FPGAs), application specific integrated circuits (ASICs), and digital signal processors (DSPs). The processor 1230 is in communication with the ingress ports 1210, receiver units 1220, transmitter units 1240, egress ports 1250, and memory 1260. The processor 1230 comprises a coding module 1270. The coding module 1270 implements the disclosed embodiments described above. For instance, the coding module 1270 implements, processes, prepares, or provides the various codec functions. The inclusion of the coding module 1270 therefore provides a substantial improvement to the functionality of the video coding device 1200 and effects a transformation of the video coding device 1200 to a different state. Alternatively, the coding module 1270 is implemented as instructions stored in the memory 1260 and executed by the processor 1230.

The video coding device 1200 may also include input and/or output (I/O) devices 1280 for communicating data to and from a user. The I/O devices 1280 may include output devices such as a display for displaying video data, speakers for outputting audio data, etc. The I/O devices 1280 may also include input devices, such as a keyboard, mouse, trackball, etc., and/or corresponding interfaces for interacting with such output devices.

The memory 1260 comprises one or more disks, tape drives, and solid-state drives and may be used as an overflow data storage device, to store programs when such programs are selected for execution, and to store instructions and data that are read during program execution. The memory 1260 may be volatile and/or non-volatile and may be read-only memory (ROM), random access memory (RAM), ternary content-addressable memory (TCAM), and/or static random-access memory (SRAM).

Figure 13:
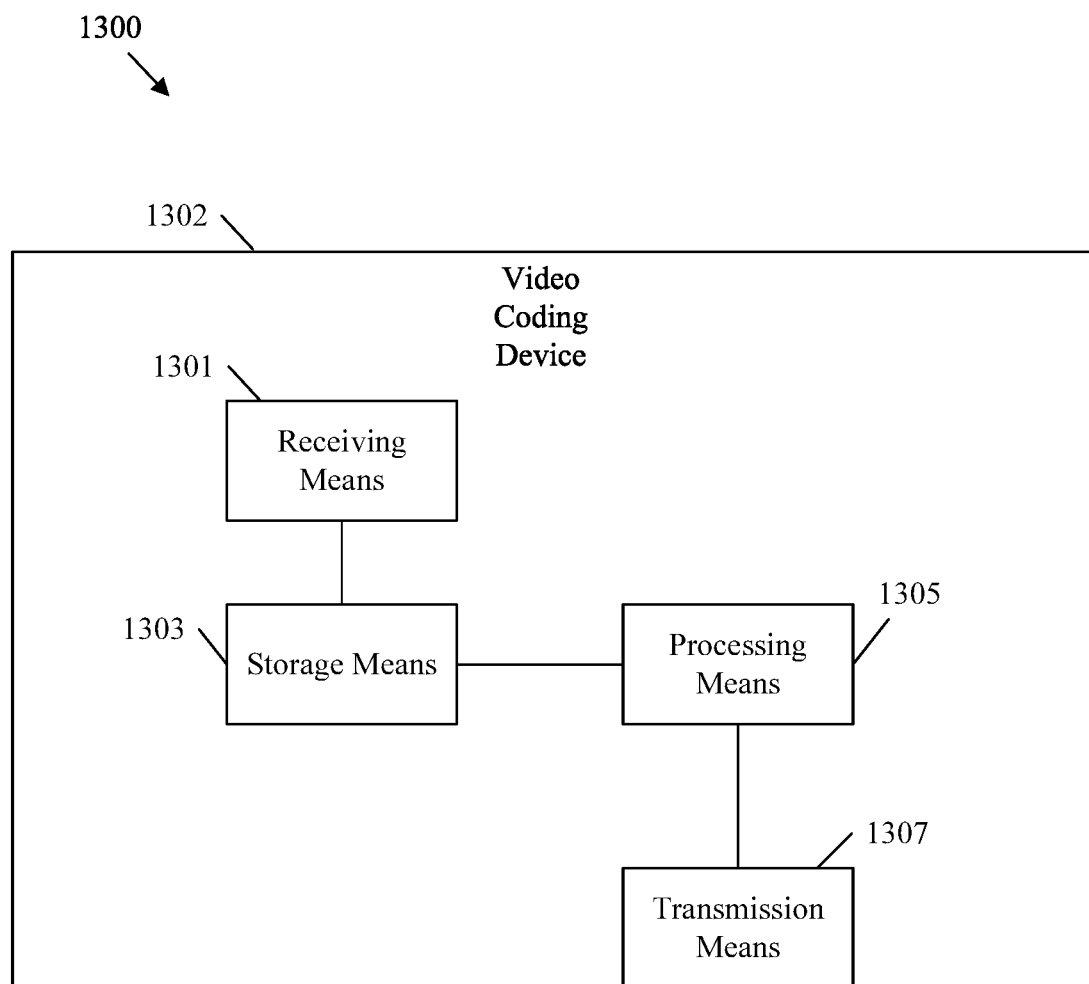
FIG. 13 is a schematic diagram of an embodiment of a means for coding.

FIG. 13 is a schematic diagram of an embodiment of a means for coding 1300. In an embodiment, the means for coding 1300 is implemented in a video coding device 1302 (e.g., a video encoder 20 or a video decoder 30). The video coding device 1302 includes receiving means 1301. The receiving means 1301 is configured to receive a picture to encode or to receive a bitstream to decode. The video coding device 1302 includes transmission means 1307 coupled to the receiving means 1301. The transmission means 1307 is configured to transmit the bitstream to a decoder or to transmit a decoded image to a display means (e.g., one of the I/O devices 1280).

The video coding device 1302 includes a storage means 1303. The storage means 1303 is coupled to at least one of the receiving means 1301 or the transmission means 1307. The storage means 1303 is configured to store instructions. The video coding device 1302 also includes processing means 1305. The processing means 1305 is coupled to the storage means 1303. The processing means 1305 is configured to execute the instructions stored in the storage means 1303 to perform the methods disclosed herein.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of decoding implemented by a video decoder, comprising:
    determining whether a resolution of a current picture being decoded is the same as a resolution of reference pictures identified by a reference picture list associated with the current picture;
    enabling bi-direction optical flow (BDOF) for a current block of the current picture when the resolution of the current picture is determined to be the same as the resolution of each of the reference pictures, a motion model index (MotionModelIdc) of the current block is equal to zero, a merge subblock flag is equal to zero, and at least one flag outside a sequence parameter set and a derived BDOF variable each have a value specifying that the BDOF is enabled;
    disabling the BDOF for the current block of the current picture based at least on the flag outside the sequence parameter set or when the resolution of the current picture is determined to be different than the resolution of either of the reference pictures; and
    refining motion vectors corresponding to the current block using the BDOF when the BDOF is enabled for the current block.

2. The method of claim 1, wherein enabling the BDOF comprises setting a BDOF flag to a first value, and wherein disabling the BDOF comprises setting the BDOF flag to a second value.

3. The method of claim 1, further comprising generating the reference pictures for the current picture based on reference picture lists in accordance with a bi-directional inter prediction mode.

4. The method of claim 1, further comprising both selectively enabling and disabling the BDOF for blocks in a plurality of pictures depending on whether a resolution of each picture is different from or the same as the resolution of reference pictures associated with the pictures.

5. The method of claim 1, further comprising enabling reference picture resampling (RPR) for an entire coded video sequence (CVS) containing the current picture when the BDOF is disabled.

6. The method of claim 1, wherein the resolution of the current picture is disposed in a parameter set of a coded video bitstream, and wherein the current block is in a slice of the current picture.

7. The method of claim 1, further comprising enabling the BDOF for the current block of the current picture when one or more of the following conditions is also met:
    a bi-prediction weight index is equal to zero;
    a first luma weight flag and a second luma weight flag are each equal to zero;
    a coding block height measured in luma samples is greater than or equal to eight; and
    a variable specifying a color component of the current block is equal to zero.

8. The method of claim 1, further comprising displaying on a display of an electronic device an image generated using the current block.

9. A method of encoding a video bitstream implemented by a video encoder, the method comprising:
    determining whether a resolution of a current picture being encoded is the same as a resolution of reference pictures identified in a reference picture list associated with the current picture;
    enabling bi-direction optical flow (BDOF) for a current block of the current picture when the resolution of the current picture is determined to be the same as the resolution of each of the reference pictures, a motion model index (MotionModelIdc) of the current block is equal to zero, a merge subblock flag is equal to zero, and at least one flag outside a sequence parameter set and a derived BDOF variable each have a value specifying that the BDOF is enabled;
    disabling the BDOF for the current block of the current picture based at least on the flag outside the sequence parameter set or when the resolution of the current picture is determined to be different than the resolution of either of the reference pictures; and
    refining motion vectors corresponding to the current block using the BDOF when the BDOF is enabled for the current block.

10. The method of claim 9, wherein the method further comprises:
    determining the motion vectors for the current picture based on the reference pictures;
    encoding the current picture based on the motion vectors; and
    decoding the current picture using a hypothetical reference decoder.

11. The method of claim 9, wherein enabling the BDOF comprises setting a BDOF flag to a first value, and wherein disabling the BDOF comprises setting the BDOF flag to a second value.

12. The method of claim 9, further comprising generating the reference pictures for the current picture based on reference picture lists in accordance with a bi-directional inter prediction mode.

13. The method of claim 9, further comprising both selectively enabling and disabling the BDOF for blocks in a plurality of pictures depending on whether a resolution of each picture is different from or the same as the resolution of reference pictures associated with the pictures.

14. The method of claim 9, further comprising enabling reference picture resampling (RPR) for an entire coded video sequence (CVS) containing the current picture even when the BDOF is disabled.

15. The method of claim 9, further comprising transmitting the video bitstream containing the current block toward a video decoder.

16. A decoding device, comprising:
a receiver configured to receive a coded video bitstream;
a memory coupled to the receiver, the memory storing instructions; and
one or more processors coupled to the memory, the one or more processors configured to execute the instructions to cause the decoding device to:
determine whether a resolution of a current picture being decoded is the same as a resolution of reference pictures identified by a reference picture list associated with the current picture;
enable bi-direction optical flow (BDOF) for a current block of the current picture when the resolution of the current picture is determined to be the same as the resolution of each of the reference pictures, a motion model index (MotionModelIdc) of the current block is equal to zero, a merge subblock flag is equal to zero, and at least one flag outside a sequence parameter set and a derived BDOF variable each have a value specifying that the BDOF is enabled;
disable the BDOF for the current block of the current picture based at least on the flag outside the sequence parameter set or when the resolution of the current picture is determined to be different than the resolution of either of the reference pictures; and
refine motion vectors corresponding to the current block using the BDOF when the BDOF is enabled for the current block.

17. The decoding device of claim 16, wherein reference picture resampling (RPR) is enabled for an entire coded video sequence (CVS) containing the current picture when the BDOF is disabled.

18. The decoding device of claim 16, further comprising a display configured to display an image as generated based on the current block.

19. An encoding device, comprising:
a memory containing instructions;
one or more processors coupled to the memory, the one or more processors configured to implement the instructions to cause the encoding device to:
determine whether a resolution of a current picture being encoded is the same as a resolution of reference pictures identified in a reference picture list associated with the current picture;
enable bi-direction optical flow (BDOF) for a current block of the current picture when the resolution of the current picture is determined to be the same as the resolution of each of the reference pictures, a motion model index (MotionModelIdc) of the current block is equal to zero, a merge subblock flag is equal to zero, and at least one flag outside a sequence parameter set and a derived BDOF variable each have a value specifying that the BDOF is enabled;
disable the BDOF for the current block of the current picture based at least on the flag outside the sequence parameter set or when the resolution of the current picture is determined to be different than the resolution of either of the reference pictures; and
refine motion vectors corresponding to the current block using the BDOF when the BDOF is enabled for the current block; and
a transmitter coupled to the one or more processors, the transmitter configured to transmit a video bitstream containing the current block toward a video decoder.

20. The encoding device of claim 19, wherein reference picture resampling (RPR) is enabled for an entire coded video sequence (CVS) containing the current picture even when the BDOF is disabled.

21. The encoding device of claim 19, wherein the memory stores the video bitstream prior to the transmitter transmitting the video bitstream toward the video decoder.

* * * * *